US011668906B2

(12) United States Patent
Lin et al.

(10) Patent No.: US 11,668,906 B2
(45) Date of Patent: *Jun. 6, 2023

(54) OPTICAL IMAGING LENS ASSEMBLY, IMAGE CAPTURING UNIT AND ELECTRONIC DEVICE

(71) Applicant: LARGAN PRECISION CO., LTD., Taichung (TW)

(72) Inventors: Yu Jui Lin, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 91 days.

This patent is subject to a terminal disclaimer.

(21) Appl. No.: 17/380,797

(22) Filed: Jul. 20, 2021

(65) Prior Publication Data

US 2021/0356708 A1    Nov. 18, 2021

Related U.S. Application Data

(63) Continuation of application No. 16/255,533, filed on Jan. 23, 2019, now Pat. No. 11,106,009.

(30) Foreign Application Priority Data

Dec. 3, 2018  (TW) .................. 107143264

(51) Int. Cl.
*G02B 13/00* (2006.01)
*G02B 9/12* (2006.01)
*G02B 13/04* (2006.01)

(52) U.S. Cl.
CPC .......... *G02B 13/0035* (2013.01); *G02B 9/12* (2013.01); *G02B 13/04* (2013.01)

(58) Field of Classification Search
CPC ....... G02B 13/0035; G02B 9/12; G02B 13/04
See application file for complete search history.

(56) References Cited

U.S. PATENT DOCUMENTS

| 8,724,239 | B2 | 5/2014 | Tsai et al. |
| 9,225,888 | B2 | 12/2015 | Huang |
| 9,885,856 | B2 | 2/2018 | Chen et al. |
| 10,802,291 | B1 | 10/2020 | Pergola et al. |

(Continued)

FOREIGN PATENT DOCUMENTS

| CN | 205507200 U | 8/2016 |
| CN | 1087108869 A | 10/2018 |

(Continued)

*Primary Examiner* — William R Alexander
*Assistant Examiner* — Sharrief I Broome
(74) *Attorney, Agent, or Firm* — Maschoff Brennan

(57) ABSTRACT

An optical imaging lens assembly includes three lens elements which are, in order from an object side to an image side: a first lens element, a second lens element and a third lens element. Each of the three lens elements has an object-side surface facing toward the object side and an image-side surface facing toward the image side. The object-side surface of the first lens element is concave in a paraxial region thereof. The object-side surface of the first lens element is aspheric and has at least one inflection point. The object-side surface of the first lens element has at least one critical point in an off-axis region thereof. The optical imaging lens assembly has a total of three lens elements.

20 Claims, 30 Drawing Sheets

(56) References Cited

U.S. PATENT DOCUMENTS

| | | | |
|---|---|---|---|
| 2013/0120859 A1* | 5/2013 | Tsai | G02B 13/0035 359/716 |
| 2016/0205297 A1* | 7/2016 | Chen | G02B 13/0035 348/335 |
| 2017/0038559 A1 | 2/2017 | Chen et al. | |
| 2017/0090192 A1* | 3/2017 | Iwasaki | G02B 9/12 |
| 2017/0235101 A1* | 8/2017 | Huang | G02B 13/04 359/784 |
| 2018/0143400 A1* | 5/2018 | Bone | G02B 25/001 |
| 2020/0005667 A1 | 1/2020 | Baker et al. | |
| 2020/0049949 A1 | 2/2020 | Tsai et al. | |
| 2020/0049955 A1 | 2/2020 | Chiu et al. | |
| 2020/0142162 A1 | 5/2020 | Huang | |

FOREIGN PATENT DOCUMENTS

| | | |
|---|---|---|
| CN | 108761781 A | 11/2018 |
| CN | 109196521 A | 1/2019 |
| CN | 208888461 U | 3/2019 |
| CN | 208569169 A | 4/2019 |
| CN | 208953768 U | 5/2019 |
| CN | 208953768 U | 6/2019 |
| CN | 209014800 U | 6/2019 |
| CN | 209044155 U | 6/2019 |
| CN | 209388019 U | 9/2019 |
| CN | 110320642 A | 10/2019 |
| CN | 110658606 A | 1/2020 |
| CN | 110737080 A | 1/2020 |
| CN | 111123489 A | 5/2020 |
| CN | 111142215 A | 5/2020 |
| JP | H11-006955 A | 1/1999 |
| JP | 2006-201674 A | 8/2006 |
| JP | 2007-279547 A | 10/2007 |
| JP | 2007-279548 A | 10/2007 |
| JP | 2008-164989 A | 7/2008 |
| JP | 2009-156950 A | 7/2009 |
| JP | 2016-170446 A | 9/2016 |
| JP | 2016-218471 A | 12/2016 |
| TW | M547110 U | 8/2017 |
| TW | I632411 B | 8/2018 |
| TW | M569426 U | 11/2018 |
| TW | I654441 B | 3/2019 |
| TW | I674448 B | 10/2019 |
| TW | 202001317 A | 1/2020 |
| WO | 2020037510 A | 2/2020 |
| WO | 2020078014 A | 4/2020 |

* cited by examiner

OPTICAL IMAGING LENS ASSEMBLY, IMAGE CAPTURING UNIT AND ELECTRONIC DEVICE

RELATED APPLICATIONS

This application is a continuation patent application of U.S. application Ser. No. 16/255,533, filed on Jan. 23, 2019, which claims priority to Taiwan Application 107143264, filed on Dec. 3, 2018, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, with the development of technology, biometric system has been developed and widely applied to various applications. For example, mobile devices can be integrated with fingerprint identification function to protect the permission and personal privacy of the users. With the development of organic light-emitting diode (OLED), under-display fingerprint identification has become the mainstream on the market. However, conventional optical systems are unable to meet the requirements of newly developed fingerprint identification modules due to the size thereof as well as other factors such as aperture size, field of view and image quality thereof. Therefore, there is a need to develop an optical system applicable to biometric identification applications.

SUMMARY

According to one aspect of the present disclosure, an optical imaging lens assembly includes three lens elements. The three lens elements are, in order from an object side to an image side, a first lens element, a second lens element and a third lens element. Each of the three lens elements has an object-side surface facing toward the object side and an image-side surface facing toward the image side. The object-side surface of the first lens element is concave in a paraxial region thereof. The object-side surface of the first lens element is aspheric and has at least one inflection point. The object-side surface of the first lens element has at least one critical point in an off-axis region thereof. The optical imaging lens assembly has a total of three lens elements. When a focal length of the optical imaging lens assembly is f, an entrance pupil diameter of the optical imaging lens assembly is EPD, and a maximum field of view of the optical imaging lens assembly is FOV, the following conditions are satisfied:

$0.50 < f/EPD < 1.9$; and $100.0[\text{deg.}] < FOV < 130.0[\text{deg.}]$.

According to another aspect of the present disclosure, an image capturing unit includes the aforementioned optical imaging lens assembly and an image sensor, wherein the image sensor is disposed on an image surface of the optical imaging lens assembly.

According to still another aspect of the present disclosure, an electronic device includes a fingerprint identification module, wherein the fingerprint identification module includes the aforementioned image capturing unit.

According to yet another aspect of the present disclosure, an optical imaging lens assembly includes three lens elements. The three lens elements are, in order from an object side to an image side, a first lens element, a second lens element and a third lens element. Each of the three lens elements has an object-side surface facing toward the object side and an image-side surface facing toward the image side. The object-side surface of the first lens element is concave in a paraxial region thereof. The object-side surface of the first lens element is aspheric and has at least one inflection point. The object-side surface of the first lens element has at least one critical point in an off-axis region thereof. The optical imaging lens assembly has a total of three lens elements. When a curvature radius of the object-side surface of the first lens element is R1, and an entrance pupil diameter of the optical imaging lens assembly is EPD, the following condition is satisfied:

$-4.0 < R1/EPD < 0$.

According to yet still another aspect of the present disclosure, an electronic device includes a fingerprint identification module and a light-permeable sheet. The fingerprint identification module includes an optical imaging lens assembly. The optical imaging lens assembly includes a plurality of lens elements. Each of the plurality of lens elements has an object-side surface facing toward an object side of the optical imaging lens assembly and an image-side surface facing toward an image side of the optical imaging lens assembly. At least one lens element of the optical imaging lens assembly has at least one lens surface having at least one critical point in an off-axis region thereof. The light-permeable sheet is disposed between the optical imaging lens assembly and an imaged object. When a sum of central thicknesses of all lens elements of the optical imaging lens assembly is ΣCT, and a central thickness of the light-permeable sheet is CTP, the following condition is satisfied:

$0 < \Sigma CT/CTP < 1.50$.

BRIEF DESCRIPTION OF THE DRAWINGS

The disclosure can be better understood by reading the following detailed description of the embodiments, with reference made to the accompanying drawings as follows.

DETAILED DESCRIPTION

An electronic device includes a fingerprint identification module and a light-permeable sheet. The fingerprint identification module includes an optical imaging lens assembly, and the optical imaging lens assembly includes a plurality of lens elements. Each of the plurality of lens elements of the optical imaging lens assembly has an object-side surface facing toward an object side of the optical imaging lens assembly and an image-side surface facing toward an image side of the optical imaging lens assembly. The plurality of lens elements includes a first lens element closest to an imaged object. The light-permeable sheet is disposed on the object side of the optical imaging lens assembly and located between the first lens element and the imaged object. The optical imaging lens assembly may include three lens element, and the three lens elements are, in order from the object side to the image side, the first lens element, a second lens element and a third lens element.

When the optical imaging lens assembly has a total of three lens elements, it is favorable for obtaining a balance among the aperture size, the field of view, the image quality and the size of the optical imaging lens assembly. However, the present disclosure is not limited to the number of lens elements. The optical imaging lens assembly may have different numbers of lens elements depending on application requirements. For example, the optical imaging lens assembly may include four or five lens elements; that is, the optical imaging lens assembly may further include a fourth lens element and a fifth lens element. In some configurations, the optical imaging lens assembly may have a total of two lens elements.

The object-side surface of the first lens element can be concave in a paraxial region thereof; therefore, it is favorable for the first lens element to have proper refractive power, and also favorable for adjusting the field of view and keeping the optical imaging lens assembly compact. The first lens element can have negative refractive power; therefore, it is favorable for the optical imaging lens assembly to achieve a wide field of view configuration.

The third lens element can have positive refractive power; therefore, it is favorable for reducing the total track length of the optical imaging lens assembly. The object-side surface of the third lens element can be convex in a paraxial region thereof; therefore, it is favorable for adjusting the refractive power of the third lens element so as to correct aberrations and reduce the total track length. The image-side surface of the third lens element can be convex in a paraxial region thereof; therefore, it is favorable for adjusting the travelling direction of light rays so as to reduce aberrations such as distortion of wide angle images.

Figure 29:
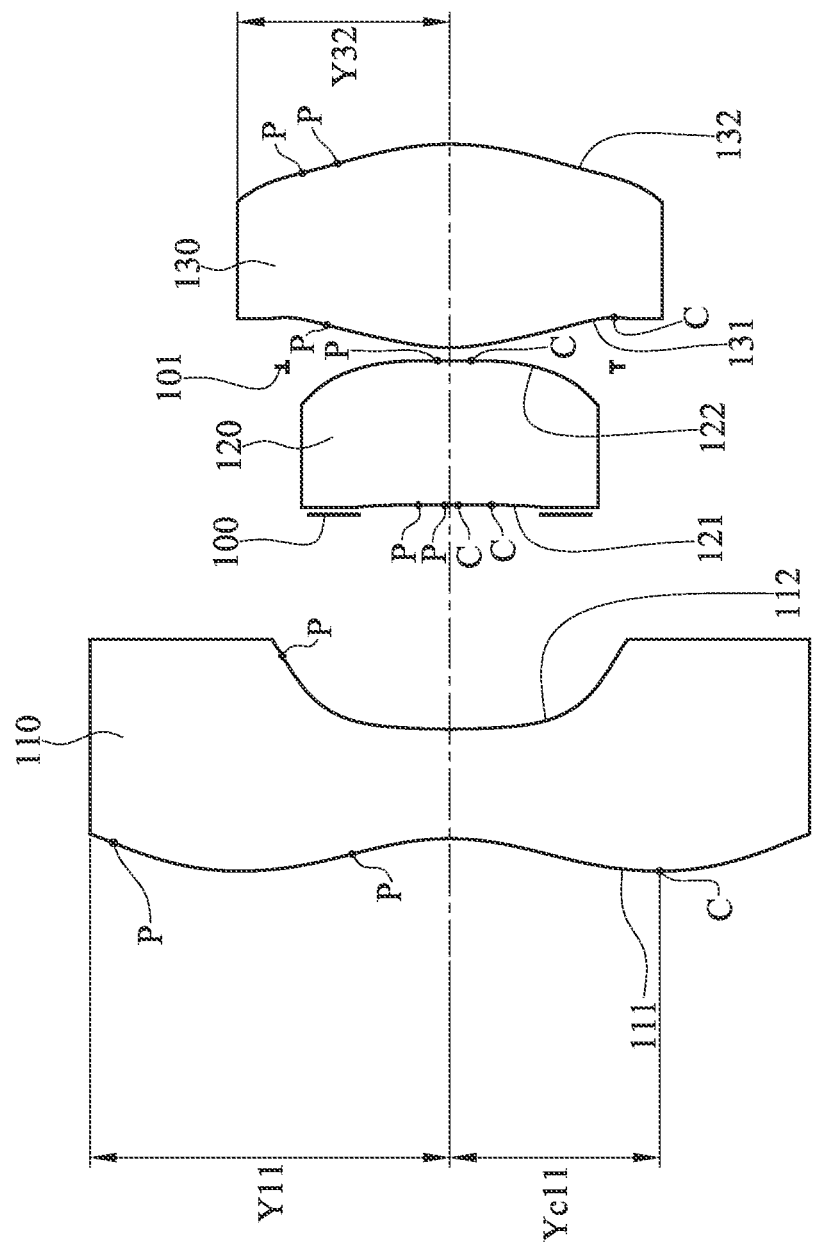
FIG. 29 shows a schematic view of Y11, Yc11, Y32 and inflection points and critical points of the first through third lens elements according to the 1st embodiment of the present disclosure.

According to the present disclosure, at least one lens element of the optical imaging lens assembly can have at least one aspheric surface having at least one inflection point. Therefore, it is favorable for increasing the shape variation of the lens elements so as to reduce the size of the optical imaging lens assembly and improve image quality. In one configuration, each of at least two lens elements of the optical imaging lens assembly can have at least one aspheric surface having at least one inflection point. In another configuration, each of at least three lens elements of the optical imaging lens assembly can have at least one aspheric surface having at least one inflection point. Please refer to FIG. 29, which shows a schematic view of inflection points P of the first lens element 110, the second lens element 120 and the third lens element 130 according to the 1st embodiment of the present disclosure.

The object-side surface of the first lens element can be aspheric, and the object-side surface of the first lens element can have at least one inflection point. Therefore, it is favorable for the optical imaging lens assembly to have a large aperture and wide field of view configuration by adjusting the shape of the first lens element.

The object-side surface of the third lens element can be aspheric, and the object-side surface of the third lens element can have at least one inflection point. Therefore, it is favorable for reducing aberrations on the peripheral region of the image surface so as to improve peripheral image quality.

According to the present disclosure, at least one lens element of the optical imaging lens assembly can have at least one lens surface having at least one critical point in an off-axis region thereof. Therefore, it is favorable for further increasing the shape variation of the lens elements so as to enhance peripheral illuminance and improve peripheral image quality. In one configuration, each of at least two lens elements of the optical imaging lens assembly can have at least one lens surface having at least one critical point in an off-axis region thereof. In another configuration, each of at least three lens elements of the optical imaging lens assembly can have at least one lens surface having at least one critical point in an off-axis region thereof. Please refer to FIG. 29, which shows a schematic view of critical points C of the first lens element 110, the second lens element 120 and the third lens element 130 according to the 1st embodiment of the present disclosure.

The object-side surface of the first lens element can have at least one critical point in an off-axis region thereof, and the critical point can be a convex critical point. Therefore, it is favorable for adjusting the travelling direction of light at wide field of view so as to reduce aberrations such as distortion and further improve peripheral image quality.

The object-side surface of the third lens element can have at least one critical point in an off-axis region thereof, and the critical point can be a concave critical point. Therefore, it is favorable for further improving image quality on the peripheral region of the image surface, and also favorable for increasing peripheral illuminance.

When a focal length of the optical imaging lens assembly is f, and an entrance pupil diameter of the optical imaging lens assembly is EPD, the following condition can be satisfied: $0.50<f/EPD<1.9$. Therefore, it is favorable for obtaining a balance between the field of view and aperture size. In one configuration, the following condition can also be satisfied: $1.0<f/EPD<1.7$.

When a maximum field of view of the optical imaging lens assembly is FOV, the following condition can be satisfied: $90.0\ [\text{deg.}]<FOV<140.0\ [\text{deg.}]$. Therefore, it is favorable for the optical imaging lens assembly to have sufficient field of view for various applications, and also favorable for preventing overly large distortion cause by overly wide field of view. In one configuration, the following condition can also be satisfied: $100.0\ [\text{deg.}]<FOV<130.0\ [\text{deg.}]$.

When a curvature radius of the object-side surface of the first lens element is R1, and the entrance pupil diameter of the optical imaging lens assembly is EPD, the following condition can be satisfied: $-4.0<R1/EPD<0$. Therefore, it is favorable for the optical imaging lens assembly to obtain a balance between miniaturization and large aperture by adjusting the shape of the first lens element and the size of the aperture stop. In one configuration, the following condition can also be satisfied: $-3.5<R1/EPD<-0.5$. In another configuration, the following condition can also be satisfied: $-3.0<R1/EPD<-1.0$.

Figure 30:
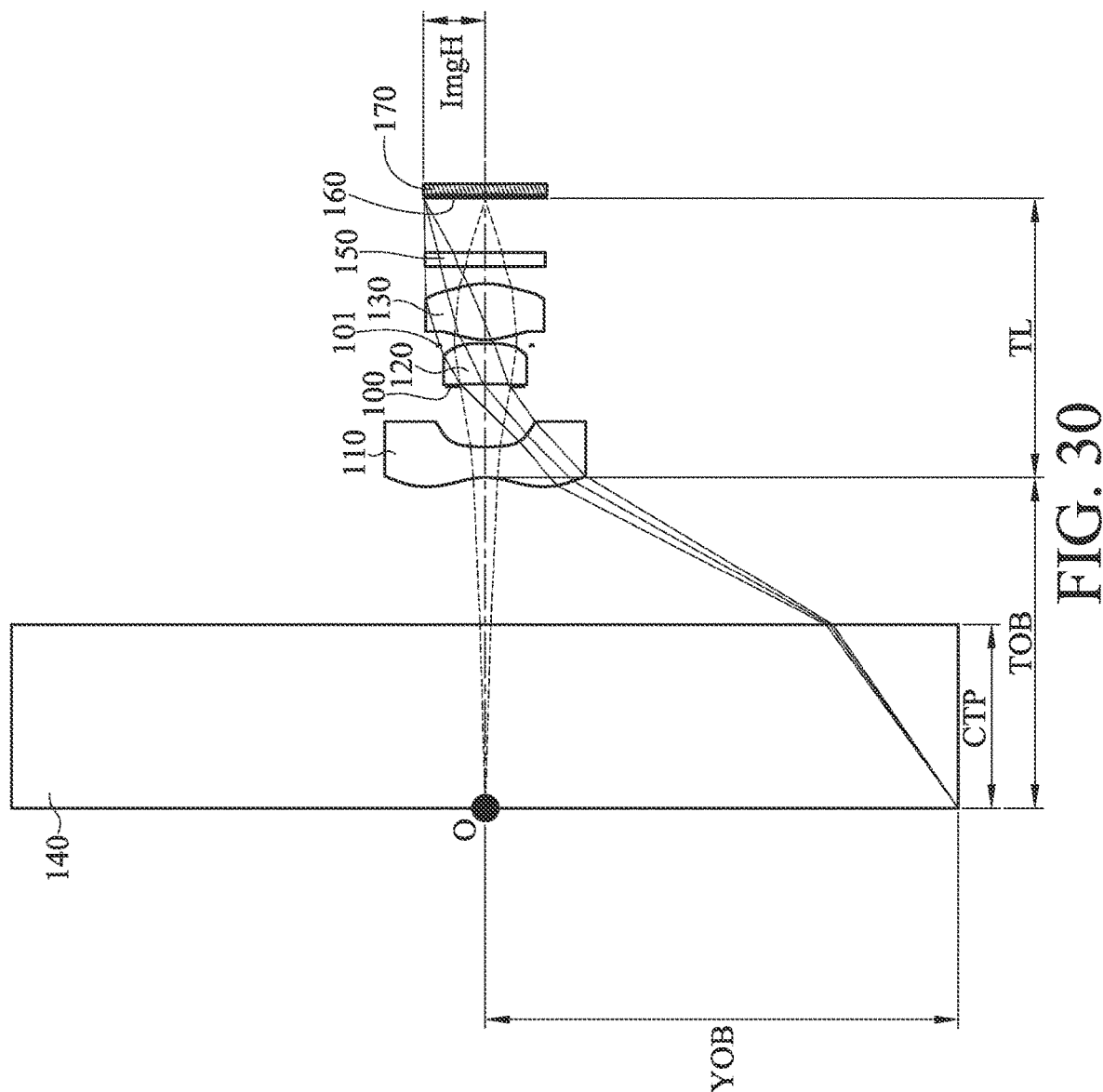
FIG. 30 shows a schematic view of YOB, CTP, TOB, TL and ImgH according to the 1st embodiment of the present disclosure.

When a sum of central thicknesses of all lens elements of the optical imaging lens assembly is ΣCT, and a central thickness of the light-permeable sheet is CTP, the following condition can be satisfied: $0<\Sigma CT/CTP<1.50$. Therefore, it is favorable for adjusting the ratio between the thicknesses of the light-permeable sheet and the lens elements of the optical imaging lens assembly so as to achieve compactness. In one configuration, the following condition can also be satisfied: $0.20<\Sigma CT/CTP<1.10$. In another configuration, the following condition can also be satisfied: $0.40<\Sigma CT/CTP<0.90$. Please refer to FIG. 30, which shows a schematic view of CTP according to the 1st embodiment of the present disclosure.

When an Abbe number of the first lens element is V1, an Abbe number of the second lens element is V2, and an Abbe number of the third lens element is V3, at least one of the following conditions can be satisfied: $10.0<V1<65.0$; $10.0<V2<65.0$; and $10.0<V3<65.0$. Therefore, when at least one of the above conditions is satisfied, it is favorable for correcting aberrations and increasing mass production by having proper material selection of the lens elements. In one configuration, at least one of the following conditions can also be satisfied: $45.0<V1<60.0$; $45.0<V2<60.0$; and $45.0<V3<60.0$. In another configuration, at least one of the following conditions can also be satisfied: $50.0<V1<60.0$; $50.0<V2<60.0$; and $50.0<V3<60.0$. According to the present disclosure, the Abbe number V of one lens element is obtained from the following equation: $V=(Nd-1)/(NF-NC)$, wherein Nd is the refractive index of said lens element at the wavelength of helium d-line (587.6 nm), NF is the refractive index of said lens element at the wavelength of hydrogen F-line (486.1 nm), and NC is the refractive index of said lens element at the wavelength of hydrogen C-line (656.3 nm).

When a maximum value among Abbe numbers of all lens elements of the optical imaging lens assembly is Vmax, and a minimum value among Abbe numbers of all lens elements of the optical imaging lens assembly is Vmin, the following condition can be satisfied: $Vmax-Vmin<15.0$. Therefore, a proper selection of materials of the lens elements is favorable for correcting aberrations, and the effect of aberration correction is more significant when the optical imaging lens assembly is operated within narrower wavelength range of light and thus having a lower need for correcting chromatic aberration. In one configuration, the following condition can also be satisfied: $Vmax-Vmin<10.0$. In another configuration, the following condition can also be satisfied: $Vmax-Vmin<5.0$.

When the sum of central thicknesses of all lens elements of the optical imaging lens assembly is ΣCT, and a sum of axial distances between each of all adjacent lens elements of the optical imaging lens assembly is ΣAT, the following condition can be satisfied: $1.2<\Sigma CT/\Sigma AT<2.8$. Therefore, it is favorable for adjusting the axial thicknesses and axial distances between the lens elements so as to reduce the size of the optical imaging lens assembly. In one configuration, the following condition can also be satisfied: $1.3<\Sigma CT/\Sigma AT<2.4$.

When an axial distance between the first lens element and the second lens element is T12, and an axial distance between the second lens element and the third lens element is T23, the following condition can be satisfied: $8.0<T12/T23<40.0$. Therefore, it is favorable for adjusting the ratio of the axial distances between the lens elements so as to correct aberrations and reduce the size of the optical imaging lens assembly. In one configuration, the following condition can also be satisfied: $12.5<T12/T23<30.0$.

When an axial distance between the object-side surface of the first lens element and an image surface is TL, and the focal length of the optical imaging lens assembly is f, the following condition can be satisfied: $5.9<TL/f<8.5$. Therefore, it is favorable for obtaining a balance between the miniaturization and large field of view of the optical imaging lens assembly. Please refer to FIG. 30, which shows a schematic view of TL according to the 1st embodiment of the present disclosure.

When the curvature radius of the object-side surface of the first lens element is R1, and the focal length of the optical imaging lens assembly is f, the following condition can be satisfied: $-4.0<R1/f<0$. Therefore, it is favorable for the first lens element to have proper refractive power. In one configuration, the following condition can also be satisfied: $-2.5<R1/f<0$.

When the focal length of the optical imaging lens assembly is f, the entrance pupil diameter of the optical imaging lens assembly is EPD, and half of the maximum field of view of the optical imaging lens assembly is HFOV, the following condition can be satisfied: $1.0<f/EPD+\cot(HFOV)<2.3$. Therefore, it is favorable for adjusting the field of view and aperture size of the optical imaging lens assembly so as to meet requirements of various applications. In one configuration, the following condition can also be satisfied: $1.5<f/EPD+\cot(HFOV)<2.2$.

When the focal length of the optical imaging lens assembly is f, a focal length of the first lens element is f1, a focal length of the second lens element is f2, and a focal length of the third lens element is f3, at least one of the following conditions can be satisfied: $|f/f1|<0.50$; $|f/f2|<0.80$; and $|f/f3|<0.80$. Therefore, when at least one of the above conditions is satisfied, it is favorable for the first through third lens elements to have proper refractive power so as to adjust the field of view and reduce aberrations generated by each lens element. In one configuration, at least one of the following condition cans also be satisfied: $0.20<|f/f1|$; and $|f/f2|<0.30$.

When the axial distance between the object-side surface of the first lens element and the image surface is TL, the following condition can be satisfied: $TL<6.0$ [mm]. Therefore, it is favorable for the miniaturization of the optical imaging lens assembly for various applications. In one configuration, the following condition can also be satisfied: $TL<4.0$ [mm]. In another configuration, the following condition can also be satisfied: $TL<3.0$ [mm]. In yet another configuration, the following condition can also be satisfied: $TL<2.4$ [mm].

When the axial distance between the object-side surface of the first lens element and the image surface is TL, and the entrance pupil diameter of the optical imaging lens assembly is EPD, the following condition can be satisfied: $1.0<TL/EPD<16.0$. Therefore, it is favorable for obtaining a balance between the miniaturization and large aperture stop of the optical imaging lens assembly. In one configuration, the following condition can also be satisfied: $5.0<TL/EPD<11.0$.

When a maximum effective radius of the object-side surface of the first lens element is Y11, and a maximum effective radius of the image-side surface of the third lens element is Y32, the following condition can be satisfied: $1.25<Y11/Y32<2.40$. Therefore, it is favorable for adjusting the ratio between the outer diameters of the lens elements so as to meet the requirements for the field of view and size of the optical imaging lens assembly. Please refer to FIG. 29, which shows a schematic view of Y11 and Y32 according to the 1st embodiment of the present disclosure.

When a vertical distance between the critical point on the object-side surface of the first lens element and an optical axis is Yc11, and the maximum effective radius of the object-side surface of the first lens element is Y11, the following condition can be satisfied: $0.30<Yc11/Y11<0.90$. Therefore, it is favorable for adjusting the position of the critical point so as to further improve image quality. In one configuration, the following condition can also be satisfied: $0.45<Yc11/Y11<0.70$. Please refer to FIG. 29, which shows a schematic view of Y11 and Yc11 according to the 1st embodiment of the present disclosure.

According to the present disclosure, at least two lens elements of the optical imaging lens assembly can be made of plastic material. Therefore, it is favorable for reducing manufacturing cost and increasing design flexibility of the optical imaging lens assembly so as to optimize the capability for correcting off-axis aberrations. In one configuration, at least three lens elements of the optical imaging lens assembly can be made of plastic material.

According to the present disclosure, the optical imaging lens assembly can be operated within a wavelength range of 400 nanometers (nm) to 700 nm. Therefore, using visible light as a light source is favorable for reducing the need of additional light sources, and the optical imaging lens assembly can work with light rays emitting from OLED displays. In one configuration, the optical imaging lens assembly can be operated within a wavelength range of 480 nm to 600 nm. In another configuration, the optical imaging lens assembly can be operated within a wavelength range of 500 nm to 575 nm.

When an axial distance between the imaged object and the object-side surface of the first lens element is TOB, and the axial distance between the object-side surface of the first lens element and the image surface is TL, the following condition can be satisfied: $0.50$ [mm]$<TOB+TL<8.0$ [mm]. Therefore, it is favorable for the imaged object and the image surface to have a proper distance therebetween so as to obtain a balance between the miniaturization and image quality of the optical imaging lens assembly. In one configuration, the following condition can also be satisfied: $1.0$ [mm]$<TOB+TL<7.0$ [mm]. In another configuration, the following condition can also be satisfied: $1.5$ [mm]$<TOB+TL<6.0$ [mm]. Please refer to FIG. 30, which shows a schematic view of TOB and TL according to the 1st embodiment of the present disclosure.

When the axial distance between the imaged object and the object-side surface of the first lens element is TOB, the axial distance between the object-side surface of the first lens element and the image surface is TL, and the entrance pupil diameter of the optical imaging lens assembly is EPD, the following condition can be satisfied: $(TOB+TL)/EPD<28.0$. Therefore, it is favorable for obtaining a balance among the miniaturization, high image quality and large aperture of the optical imaging lens assembly. In one configuration, the following condition can also be satisfied: $10.0<(TOB+TL)/EPD<25.0$.

When a maximum image height of the optical imaging lens assembly (half of a diagonal length of an effective photosensitive area of an image sensor) is ImgH, and an object height corresponding to the maximum image height of the optical imaging lens assembly is YOB, the following condition can be satisfied: $YOB/ImgH<40.0$; therefore, it is favorable for adjusting the optical magnification for various applications. In one configuration, the following condition can also be satisfied: $YOB/ImgH<20.0$. In another configuration, the following condition can also be satisfied: YOB/ImgH<9.0. In still another configuration, the following condition can also be satisfied: 2.0<YOB/ImgH; therefore, it is favorable for preventing overly large optical magnification so as to obtain a proper balance between the miniaturization and image quality of the optical imaging lens assembly. In one configuration, the following condition can also be satisfied: 4.0<YOB/ImgH. In another configuration, the following condition can also be satisfied: 6.0<YOB/ImgH. In yet another configuration, the following condition can also be satisfied: 2.0<YOB/ImgH<9.0. Please refer to FIG. 30, which shows a schematic view of YOB and ImgH according to the 1st embodiment of the present disclosure.

When the axial distance between the imaged object and the object-side surface of the first lens element is TOB, and the axial distance between the object-side surface of the first lens element and the image surface is TL, the following condition can be satisfied: 0.50<TOB/TL<2.0. Therefore, it is favorable for adjusting the ratio of the object distance to the total track length of the optical imaging lens assembly so as to have a proper field of view. In one configuration, the following condition can also be satisfied: 0.80<TOB/TL<1.5.

When the central thickness of the light-permeable sheet is CTP, the following condition can be satisfied: 0.2 [mm]<CTP<3.0 [mm]. Therefore, it is favorable for preventing the light-permeable sheet from being overly thick so as to reduce the size; furthermore, it's also favorable for preventing the light-permeable sheet from being overly thin so as to ensure that the light-permeable sheet has sufficient structural strength against external forces. In one configuration, the following condition can also be satisfied: 0.8 [mm]<CTP<2.2 [mm]. In another configuration, the following condition can also be satisfied: 1.2 [mm]<CTP<1.8 [mm].

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the optical imaging lens assembly can be effectively shortened. The aspheric surfaces may be formed by plastic injection molding or glass molding.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, when the parameters (e.g., refractive index and focal length) of the optical imaging lens assembly, the image capturing unit and the electronic device are not specifically defined, these parameters may be determined according to the operating wavelength range.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the optical imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the present disclosure, the optical imaging lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
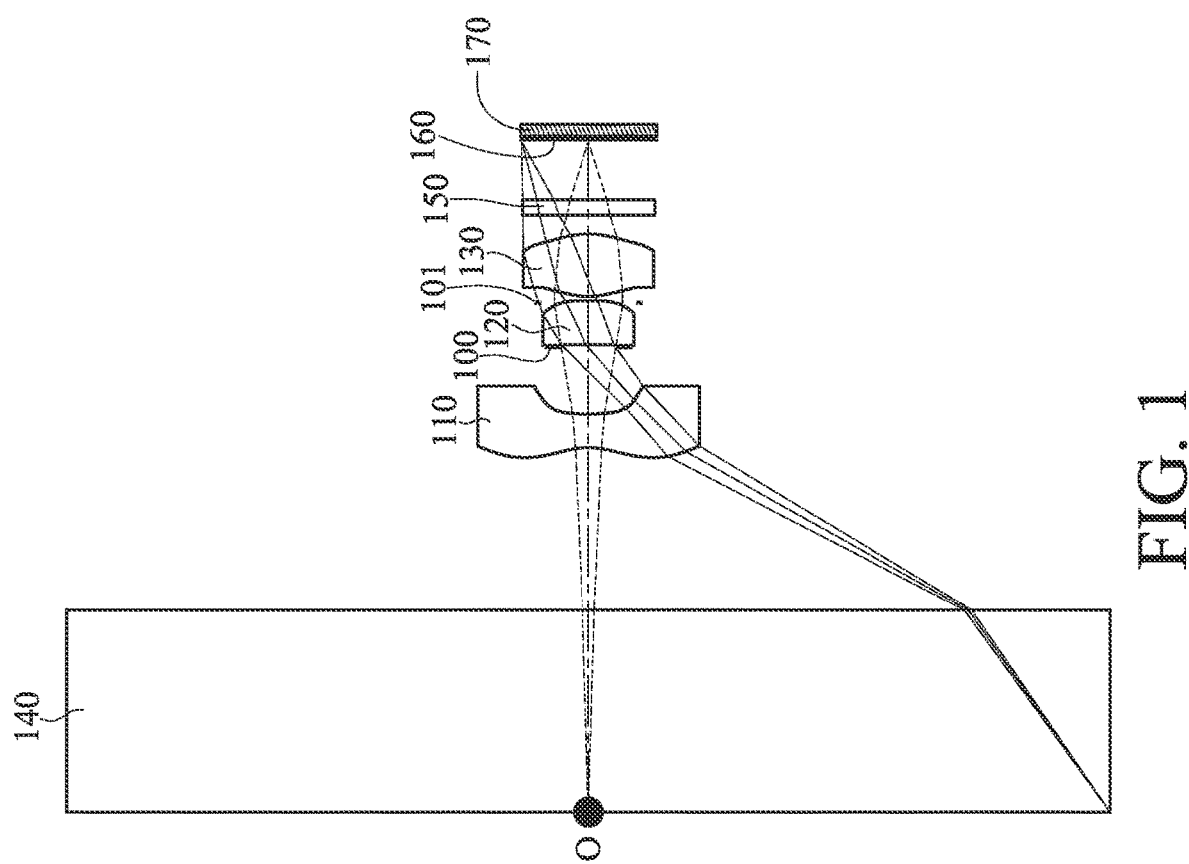
FIG. 1 is a schematic view of an image capturing unit and a light-permeable sheet according to the 1st embodiment of the present disclosure.
Figure 2:
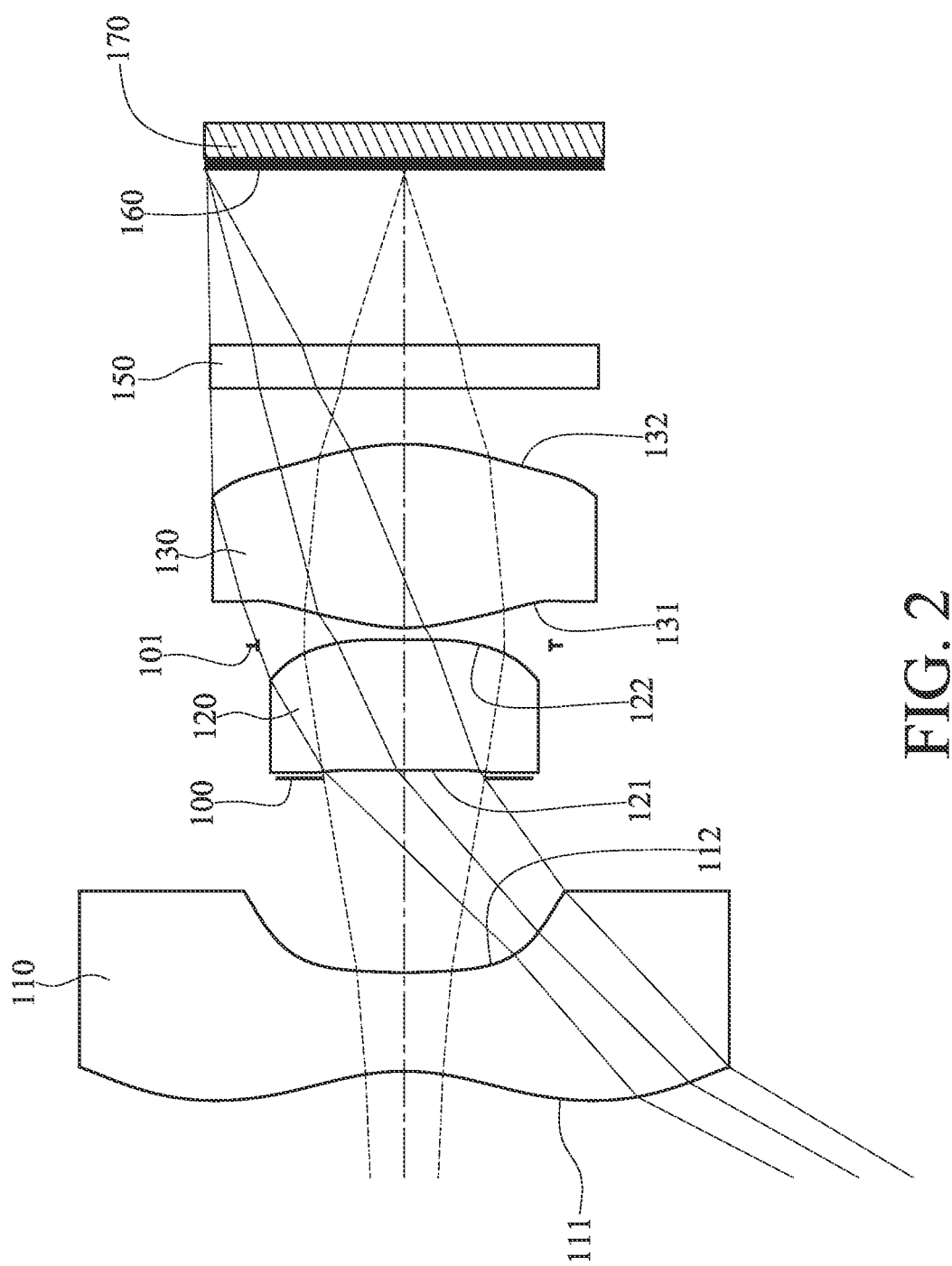
FIG. 2 is a schematic view of the image capturing unit in FIG. 1.
Figure 3:
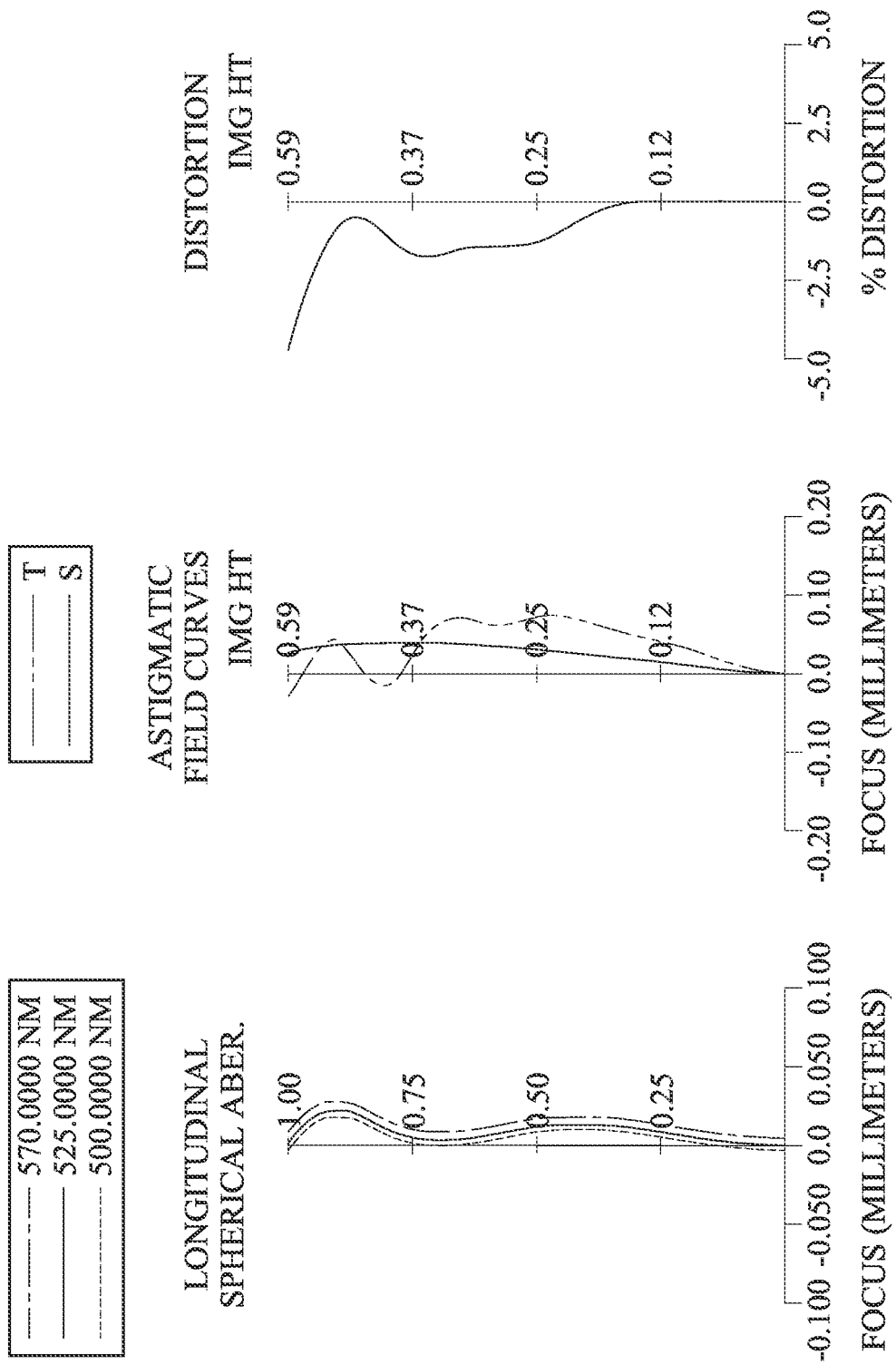
FIG. 3 shows spherical aberration curves, astigmatic field curves and a distortion curve of the image capturing unit according to the 1st embodiment.

FIG. 1 is a schematic view of an image capturing unit and a light-permeable sheet according to the 1st embodiment of the present disclosure. FIG. 2 is a schematic view of the image capturing unit in FIG. 1. FIG. 3 shows, in order from left to right, spherical aberration curves, astigmatic field curves and a distortion curve of the image capturing unit according to the 1st embodiment. In FIG. 1 and FIG. 2, the image capturing unit includes the optical imaging lens assembly (its reference numeral is omitted) of the present disclosure and an image sensor 170. The optical imaging lens assembly includes, in order from an object side to an image side, a first lens element 110, an aperture stop 100, a second lens element 120, a stop 101, a third lens element 130, a filter 150 and an image surface 160. The optical imaging lens assembly includes three lens elements (110, 120 and 130) with no additional lens element disposed between each of the adjacent three lens elements. A light-permeable sheet 140 is disposed between an imaged object O and the optical imaging lens assembly.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has two inflection points. The image-side surface 112 of the first lens element 110 has one inflection point. The object-side surface 111 of the first lens element 110 has one critical point in an off-axis region thereof.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has two inflection points. The image-side surface 122 of the second lens element 120 has one inflection point. The object-side surface 121 of the second lens element 120 has two critical points in an off-axis region thereof. The image-side surface 122 of the second lens element 120 has one critical point in an off-axis region thereof.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric. The object-side surface 131 of the third lens element 130 has one inflection point. The image-side surface 132 of the third lens element 130 has two inflection points. The object-side surface 131 of the third lens element 130 has one concave critical point in an off-axis region thereof.

The light-permeable sheet 140 is made of glass material and will not affect the focal length of the optical imaging lens assembly. The filter 150 is made of glass material and located between the third lens element 130 and the image surface 160, and will not affect the focal length of the optical imaging lens assembly. The image sensor 170 is disposed on or near the image surface 160 of the optical imaging lens assembly.

The equation of the aspheric surface profiles of the aforementioned lens elements of the 1st embodiment is expressed as follows:

$$X(Y) = (Y^2/R)/(1+\text{sqrt}(1-(1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the optical imaging lens assembly of the image capturing unit according to the 1st embodiment, when a focal length of the optical imaging lens assembly is f, an f-number of the optical imaging lens assembly in a working distance (in this condition, the working distance includes the thickness of the light-permeable sheet) is Fno(work), an f-number of the optical imaging lens assembly for imaged object at an infinite distance is Fno(inf.), and half of a maximum field of view of the optical imaging lens assembly is HFOV, these parameters have the following values: f=0.34 millimeters (mm), Fno(work)=1.51, Fno(inf.)=1.48, HFOV=60.7 degrees (deg.).

When an Abbe number of the first lens element 110 is V1, the following condition is satisfied: V1=56.0.

When an Abbe number of the second lens element 120 is V2, the following condition is satisfied: V2=56.0.

When an Abbe number of the third lens element 130 is V3, the following condition is satisfied: V3=56.0.

When a maximum value among Abbe numbers of all lens elements of the optical imaging lens assembly is Vmax, and a minimum value among Abbe numbers of all lens elements of the optical imaging lens assembly is Vmin, the following condition is satisfied: Vmax−Vmin=0.0. In this embodiment, the Abbe numbers of the first lens element 110, the second lens element 120 and the third lens element 130 are the same, so Vmax and Vmin are both equal to the Abbe numbers of the first lens element 110, the second lens element 120 and the third lens element 130.

When a sum of central thicknesses of all lens elements of the optical imaging lens assembly is ΣCT, and a sum of axial distances between each of all adjacent lens elements of the optical imaging lens assembly is ΣAT, the following condition is satisfied: ΣCT/ΣAT=1.93. In this embodiment, an axial distance between two adjacent lens elements is an air gap in a paraxial region between the two adjacent lens elements. ΣCT is a sum of the central thicknesses of the first lens element 110, the second lens element 120 and the third lens element 130; ΣAT is a sum of the axial distance between the first lens element 110 and the second lens element 120, and the axial distance between the second lens element 120 and the third lens element 130.

When the sum of central thicknesses of all lens elements of the optical imaging lens assembly is ΣCT, and a central thickness of the light-permeable sheet 140 is CTP, the following condition is satisfied: ΣCT/CTP=0.70.

When the central thickness of the light-permeable sheet 140 is CTP, the following condition is satisfied: CTP=1.50 [mm].

When the axial distance between the first lens element 110 and the second lens element 120 is T12, and the axial distance between the second lens element 120 and the third lens element 130 is T23, the following condition is satisfied: T12/T23=17.07.

When an axial distance between the object-side surface 111 of the first lens element 110 and the image surface 160 is TL, the following condition is satisfied: TL=2.28 [mm].

When the axial distance between the object-side surface 111 of the first lens element 110 and the image surface 160 is TL, and an entrance pupil diameter of the optical imaging lens assembly is EPD, the following condition is satisfied: TL/EPD=9.92.

When the axial distance between the object-side surface 111 of the first lens element 110 and the image surface 160 is TL, and the focal length of the optical imaging lens assembly is f, the following condition is satisfied: TL/f=6.71.

When an axial distance between the imaged object O and the object-side surface 111 of the first lens element 110 is TOB, and the axial distance between the object-side surface 111 of the first lens element 110 and the image surface 160 is TL, the following condition is satisfied: TOB+TL=4.98 [mm].

When the axial distance between the imaged object O and the object-side surface 111 of the first lens element 110 is TOB, the axial distance between the object-side surface 111 of the first lens element 110 and the image surface 160 is TL, and the entrance pupil diameter of the optical imaging lens assembly is EPD, the following condition is satisfied: (TOB+TL)/EPD=21.67.

When the axial distance between the imaged object O and the object-side surface 111 of the first lens element 110 is TOB, and the axial distance between the object-side surface 111 of the first lens element 110 and the image surface 160 is TL, the following condition is satisfied: TOB/TL=1.18.

When a curvature radius of the object-side surface 111 of the first lens element 110 is R1, and the entrance pupil diameter of the optical imaging lens assembly is EPD, the following condition is satisfied: R1/EPD=−2.56.

When the curvature radius of the object-side surface 111 of the first lens element 110 is R1, and the focal length of the optical imaging lens assembly is f, the following condition is satisfied: R1/f=−1.73.

When the focal length of the optical imaging lens assembly is f, and the entrance pupil diameter of the optical imaging lens assembly is EPD, the following condition is satisfied: f/EPD=1.48.

When the focal length of the optical imaging lens assembly is f, the entrance pupil diameter of the optical imaging lens assembly is EPD, and half of the maximum field of view of the optical imaging lens assembly is HFOV, the following condition is satisfied: f/EPD+cot(HFOV)=2.04.

When the focal length of the optical imaging lens assembly is f, and a focal length of the first lens element 110 is f1, the following condition is satisfied: |f/f1|=0.45.

When the focal length of the optical imaging lens assembly is f, and a focal length of the second lens element 120 is f2, the following condition is satisfied: |f/f2|=0.03.

When the focal length of the optical imaging lens assembly is f, and a focal length of the third lens element 130 is f3, the following condition is satisfied: |f/f3|=0.63.

When the maximum field of view of the optical imaging lens assembly is FOV, the following condition is satisfied: FOV=121.4 [deg.].

When a maximum effective radius of the object-side surface 111 of the first lens element 110 is Y11, and a maximum effective radius of the image-side surface 132 of the third lens element 130 is Y32, the following condition is satisfied: Y11/Y32=1.70.

When a vertical distance between the critical point on the object-side surface 111 of the first lens element 110 and the optical axis is Yc11, and the maximum effective radius of the object-side surface 111 of the first lens element 110 is Y11, the following condition is satisfied: Yc11/Y11=0.58.

When a maximum image height of the optical imaging lens assembly is ImgH, and an object height corresponding to the maximum image height of the optical imaging lens assembly is YOB, the following condition is satisfied: YOB/ImgH=7.72.

The detailed optical data of the 1st embodiment are shown in Table 1 and the aspheric surface data are shown in Table 2 below.

TABLE 1

1st Embodiment f = 0.34 mm, Fno (work) = 1.51, Fno (inf.) = 1.48, HFOV = 60.7 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.500 | Glass | 1.520 | 64.2 | — |
| 2 | | Plano | | 1.202 | | | | |
| 3 | Lens 1 | −0.589 | (ASP) | 0.250 | Plastic | 1.548 | 56.0 | −0.76 |
| 4 | | 1.614 | (ASP) | 0.491 | | | | |
| 5 | Ape. Stop | Plano | | 0.021 | | | | |
| 6 | Lens 2 | −100.000 | (ASP) | 0.330 | Plastic | 1.548 | 56.0 | −12.64 |
| 7 | | 7.450 | (ASP) | −0.014 | | | | |
| 8 | Stop | Plano | | 0.044 | | | | |
| 9 | Lens 3 | 0.421 | (ASP) | 0.465 | Plastic | 1.548 | 56.0 | 0.54 |

TABLE 1-continued

1st Embodiment f = 0.34 mm, Fno (work) = 1.51, Fno (inf.) = 1.48, HFOV = 60.7 deg.

| Surface # | | Curvature Radius | | Thickness | Material | Index | Abbe # | Focal Length |
|---|---|---|---|---|---|---|---|---|
| 10 | | −0.595 | (ASP) | 0.141 | | | | |
| 11 | Filter | Plano | | 0.110 | Glass | 1.520 | 64.2 | — |
| 12 | | Plano | | 0.444 | | | | |
| 13 | Image | Plano | | — | | | | |

Note:
Reference wavelength is 525.0 nm.
The working distance is the axial distance (2.702 mm) between the imaged object O (Surface 0) and the object-side surface 111 (Surface 3).
An effective radius of the stop 101 (Surface 8) is 0.370 mm.

TABLE 2

Aspheric Coefficients

| Surface # | 3 | 4 | 6 | 7 | 9 | 10 |
|---|---|---|---|---|---|---|
| k = | −2.1520E+00 | 0.0000E+30 | 9.0000E+01 | 9.0000E+01 | −4.6642E−01 | 0.0000E+00 |
| A4 = | 1.6242E+00 | −6.8064E−01 | 7.0403E+00 | −1.3875E+01 | −1.8695E+01 | 4.5803E+00 |
| A6 = | 1.6310E+01 | −8.0063E+01 | −6.8089E+01 | 2.9828E+02 | −4.8914E+01 | −4.8914E+01 |
| A8 = | −1.6875E+02 | 6.9842E+03 | 3.6653E+04 | 6.5540E+03 | −3.6723E+03 | 6.3324E+02 |
| A10 = | 7.5498E+02 | −1.4176E+05 | −1.1200E+05 | 3.2602E+04 | −3.9956E+03 | −3.9956E+03 |
| A12 = | −1.9559E+03 | 1.4495E+06 | 1.0098E+07 | 8.4690E+05 | −1.9499E+05 | 1.1543E+04 |
| A14 = | 3.0929E+03 | −7.9643E+06 | −3.0411E+06 | 6.4532E+05 | −1.4255E+04 | −1.4255E+04 |
| A16 = | −2.9328E+03 | 2.2161E+07 | — | 4.3295E+06 | −8.6150E+05 | 5.6438E+03 |
| A18 = | 1.5239E+03 | −2.4430E+07 | — | — | — | — |
| A20 = | −3.3121E+02 | — | — | — | — | — |

In Table 1, the curvature radius, the thickness and the focal length are shown in millimeters (mm). Surface numbers 0-13 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 4:
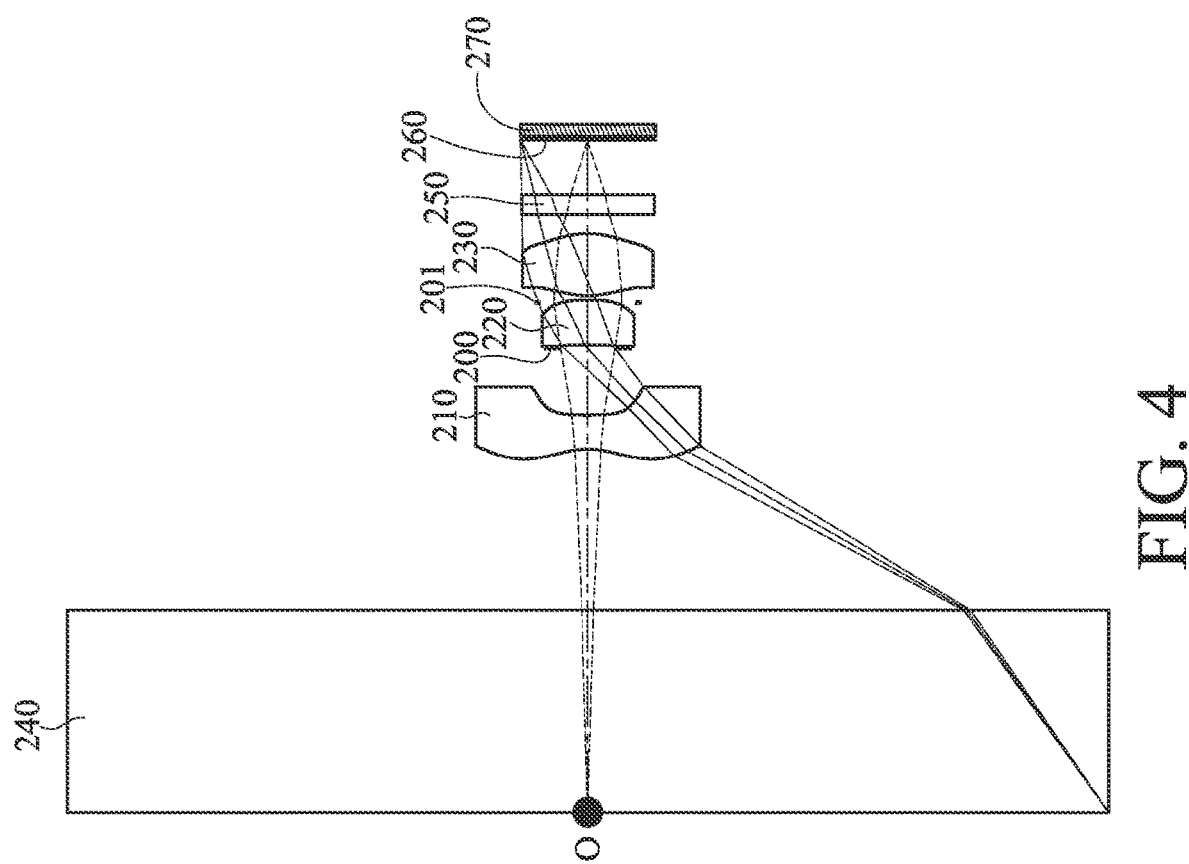
FIG. 4 is a schematic view of an image capturing unit and a light-permeable sheet according to the 2nd embodiment of the present disclosure.
Figure 5:
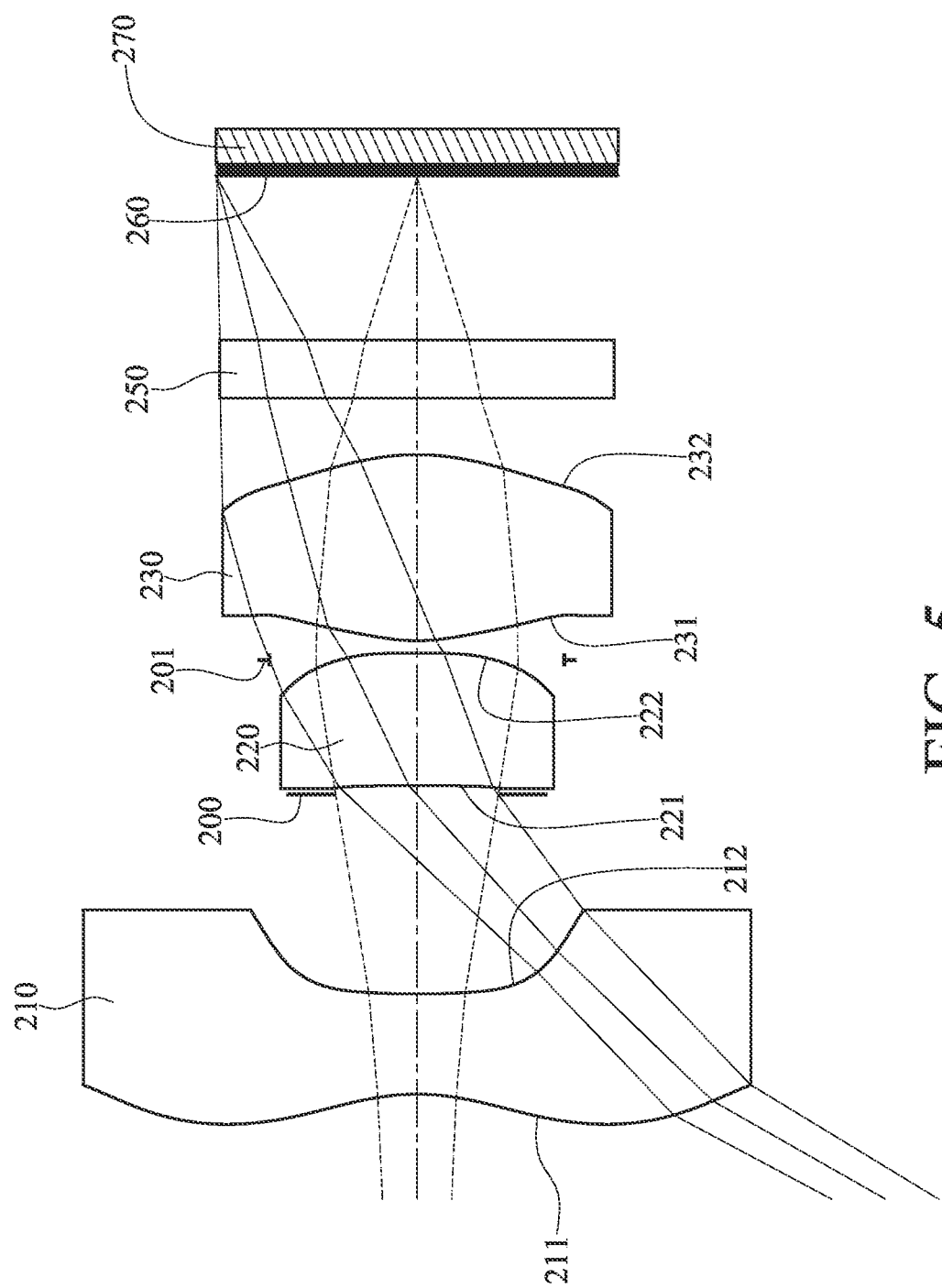
FIG. 5 is a schematic view of the image capturing unit in FIG. 4.
Figure 6:
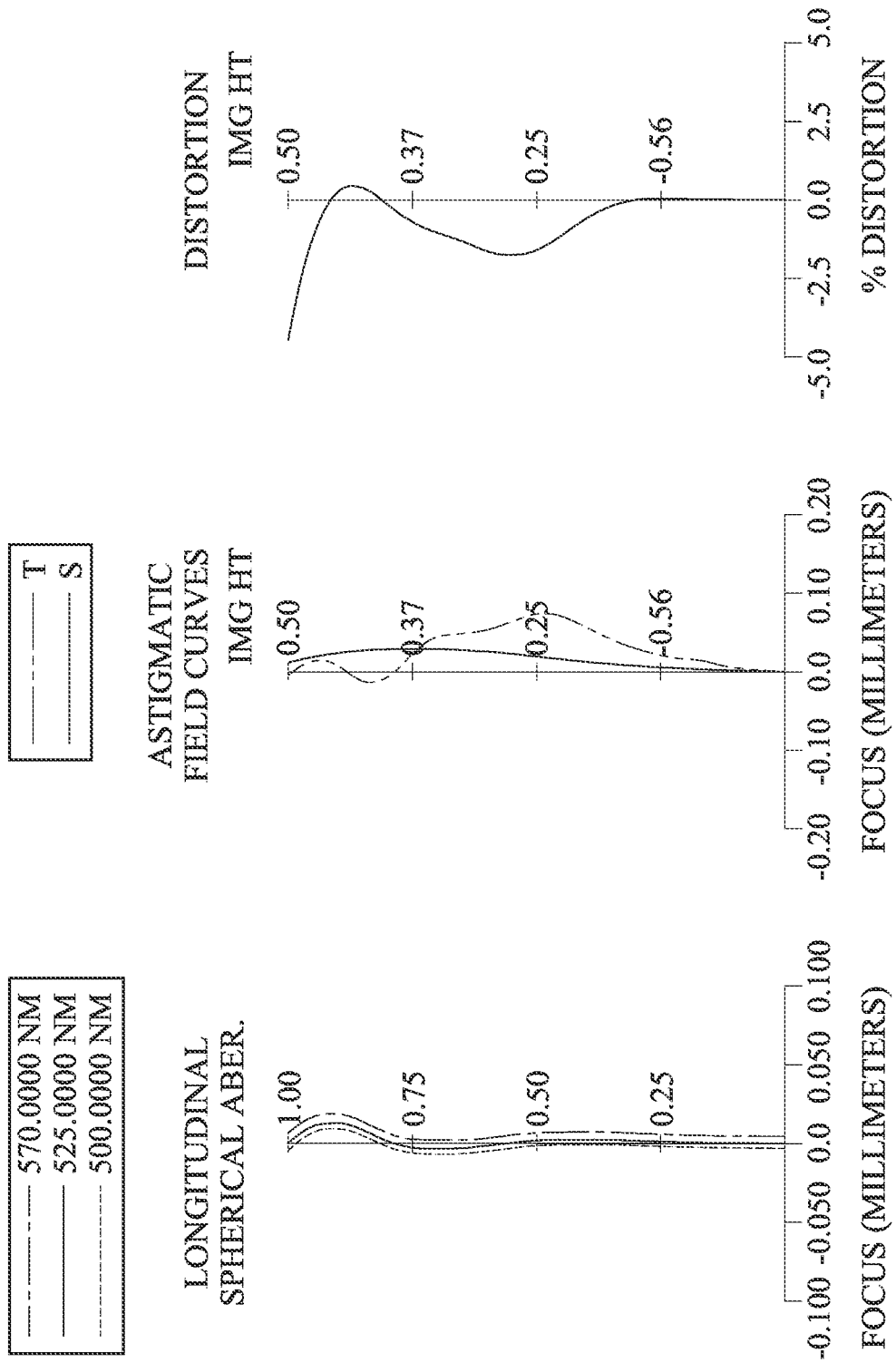
FIG. 6 shows spherical aberration curves, astigmatic field curves and a distortion curve of the image capturing unit according to the 2nd embodiment.

FIG. 4 is a schematic view of an image capturing unit and a light-permeable sheet according to the 2nd embodiment of the present disclosure. FIG. 5 is a schematic view of the image capturing unit in FIG. 4. FIG. 6 shows, in order from left to right, spherical aberration curves, astigmatic field curves and a distortion curve of the image capturing unit according to the 2nd embodiment. In FIG. 4 and FIG. 5, the image capturing unit includes the optical imaging lens assembly (its reference numeral is omitted) of the present disclosure and an image sensor 270. The optical imaging lens assembly includes, in order from an object side to an image side, a first lens element 210, an aperture stop 200, a second lens element 220, a stop 201, a third lens element 230, a filter 250 and an image surface 260. The optical imaging lens assembly includes three lens elements (210, 220 and 230) with no additional lens element disposed between each of the adjacent three lens elements. A light-permeable sheet 240 is disposed between an imaged object O and the optical imaging lens assembly.

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has two inflection points. The image-side surface 212 of the first lens element 210 has one inflection point. The object-side surface 211 of the first lens element 210 has one critical point in an off-axis region thereof.

The second lens element 220 with negative refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric. The object-side surface 221 of the second lens element 220 has two inflection points.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric. The object-side surface 231 of the third lens element 230 has one inflection point. The image-side surface 232 of the third lens element 230 has two inflection points. The object-side surface 231 of the third lens element 230 has one concave critical point in an off-axis region thereof.

The light-permeable sheet 240 is made of glass material and will not affect the focal length of the optical imaging lens assembly. The filter 250 is made of glass material and located between the third lens element 230 and the image surface 260, and will not affect the focal length of the optical imaging lens assembly. The image sensor 270 is disposed on or near the image surface 260 of the optical imaging lens assembly.

The detailed optical data of the 2nd embodiment are shown in Table 3 and the aspheric surface data are shown in Table 4 below.

TABLE 3

2nd Embodiment
f = 0.34 mm, Fno (work) = 1.51, Fno (inf.) = 1.48, HFOV = 60.3 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.500 | Glass | 1.520 | 64.2 | — |
| 2 | | Plano | | 1.195 | | | | |
| 3 | Lens 1 | −0.557 | (ASP) | 0.250 | Plastic | 1.548 | 56.0 | −0.79 |
| 4 | | 2.237 | (ASP) | 0.497 | | | | |
| 5 | Ape. Stop | Plano | | 0.022 | | | | |
| 6 | Lens 2 | −16.897 | (ASP) | 0.331 | Plastic | 1.548 | 56.0 | −34.11 |
| 7 | | −177.620 | (ASP) | −0.017 | | | | |
| 8 | Stop | Plano | | 0.048 | | | | |
| 9 | Lens 3 | 0.443 | (ASP) | 0.464 | Plastic | 1.548 | 56.0 | 0.55 |
| 10 | | −0.595 | (ASP) | 0.141 | | | | |
| 11 | Filter | Plano | | 0.145 | Glass | 1.520 | 64.2 | — |
| 12 | | Plano | | 0.410 | | | | |
| 13 | Image | Plano | | — | | | | |

Note:
Reference wavelength is 525.0 nm.
The working distance is the axial distance (2.695 mm) between the imaged object 0 (Surface 0) and the object-side surface 211 (Surface 3).
An effective radius of the stop 201 (Surface 8) is 0.367 mm.

TABLE 4

Aspheric Coefficients

| Surface # | 3 | 4 | 6 | 7 | 9 | 10 |
|---|---|---|---|---|---|---|
| k = | −2.8547E+00 | 0.0000E+00 | −9.9000E+01 | −9.9000E+01 | −3.7987E−01 | 0.0000E+00 |
| A4 = | 2.2704E+00 | −2.2735E−01 | −1.7511E+01 | −2.0393E+01 | 3.3381E+00 | 3.3381E+00 |
| A6 = | 1.2717E+00 | −2.1331E+01 | 1.5106E+02 | 3.6505E+02 | −1.8616E+01 | −1.8616E+01 |
| A8 = | −4.5738E+01 | 3.9977E+03 | 3.5737E+04 | 5.4749E+02 | −4.8527E+03 | 1.5686E+02 |
| A10 = | 2.0413E+02 | −8.1901E+04 | −2.1367E+04 | 4.4031E+04 | −1.1990E+04 | −1.1990E+04 |
| A12 = | −4.6969E+02 | 8.2706E+05 | 1.0005E+07 | 9.5418E+04 | −2.5463E+05 | −5.8214E+03 |
| A14 = | 6.2447E+02 | −4.4633E+06 | 1.4882E+05 | 8.0270E+05 | 2.3138E+04 | 2.3138E+04 |
| A16 = | −4.7117E+02 | 1.2128E+07 | — | −1.0358E+06 | −1.0271E+06 | −2.5558E+04 |
| A18 = | 1.7676E+02 | −1.2988E+07 | — | — | — | — |
| A20 = | −2.1481E+01 | — | — | — | — | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

2nd Embodiment

| f [mm] | 0.34 | TOB + TL [mm] | 4.99 |
|---|---|---|---|
| Fno(work) | 1.51 | (TOB + TL)/EPD | 21.68 |
| Fno(inf.) | 1.48 | TOB/TL | 1.18 |
| HFOV [deg.] | 60.3 | R1/EPD | −2.42 |
| V1 | 56.0 | R1/f | −1.63 |
| V2 | 56.0 | f/EPD | 1.48 |
| V3 | 56.0 | f/EPD + cot(HFOV) | 2.05 |
| Vmax−Vmin | 0.0 | |f/f1| | 0.43 |
| ΣCT/ΣAT | 1.90 | |f/f2| | 0.01 |
| ΣCT/CTP | 0.70 | |f/f3| | 0.62 |
| CTP [mm] | 1.50 | FOV [deg.] | 120.7 |
| T12/T23 | 16.74 | Y11/Y32 | 1.72 |
| TL [mm] | 2.29 | Yc11/Y11 | 0.57 |
| TL/EPD | 9.96 | YOB/ImgH | 7.70 |
| TL/f | 6.72 | — | — |

3rd Embodiment

Figure 7:
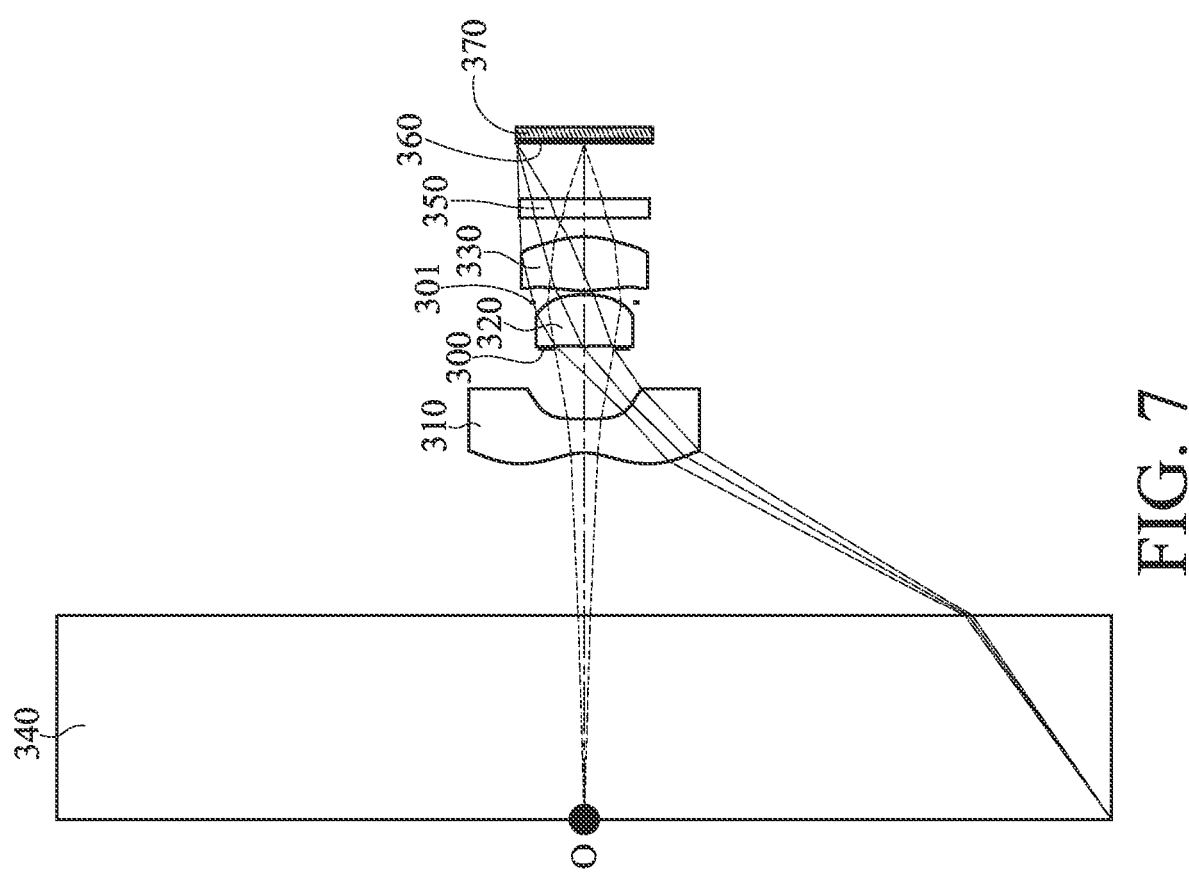
FIG. 7 is a schematic view of an image capturing unit and a light-permeable sheet according to the 3rd embodiment of the present disclosure.
Figure 8:
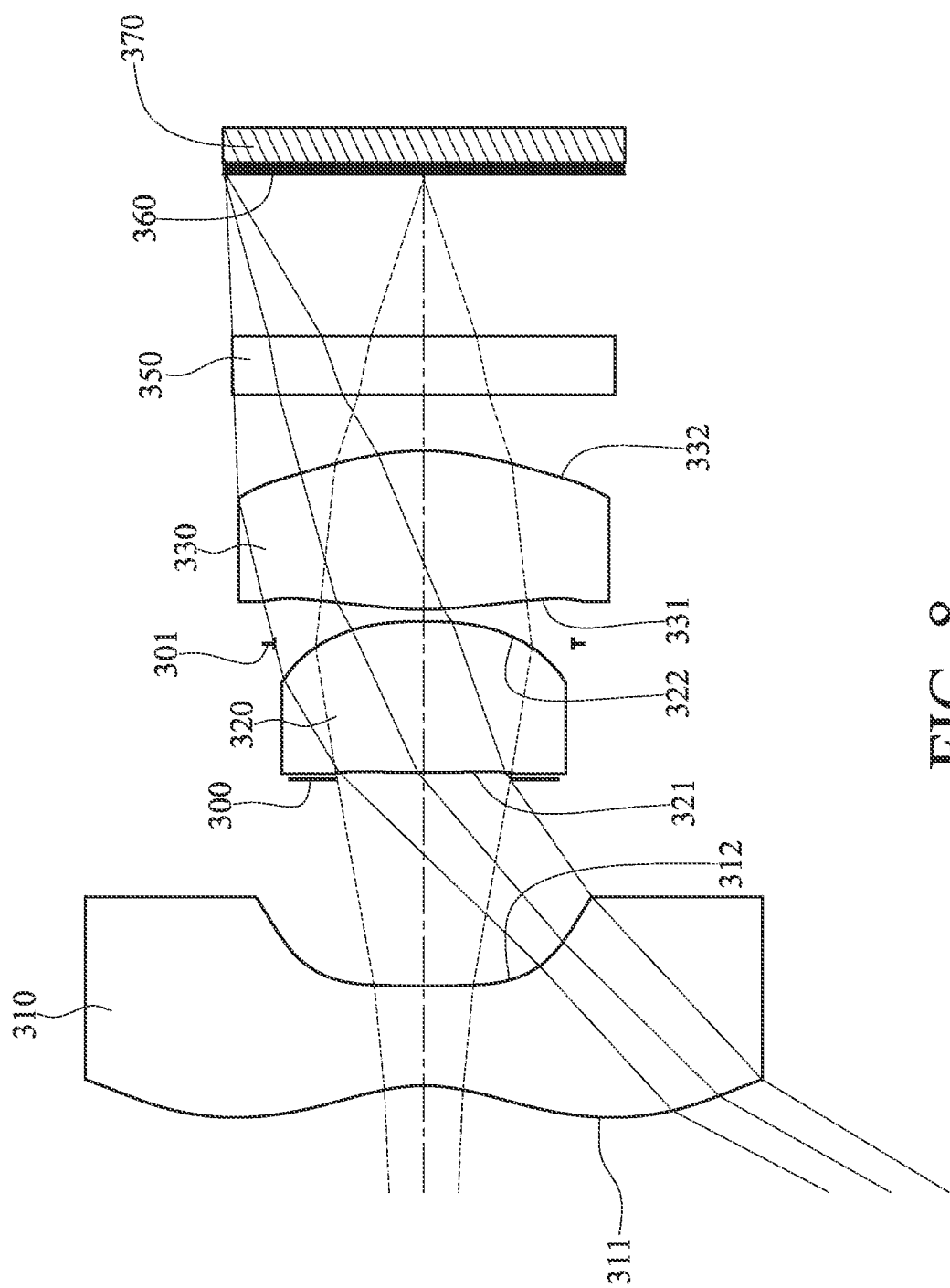
FIG. 8 is a schematic view of the image capturing unit in FIG. 7.
Figure 9:
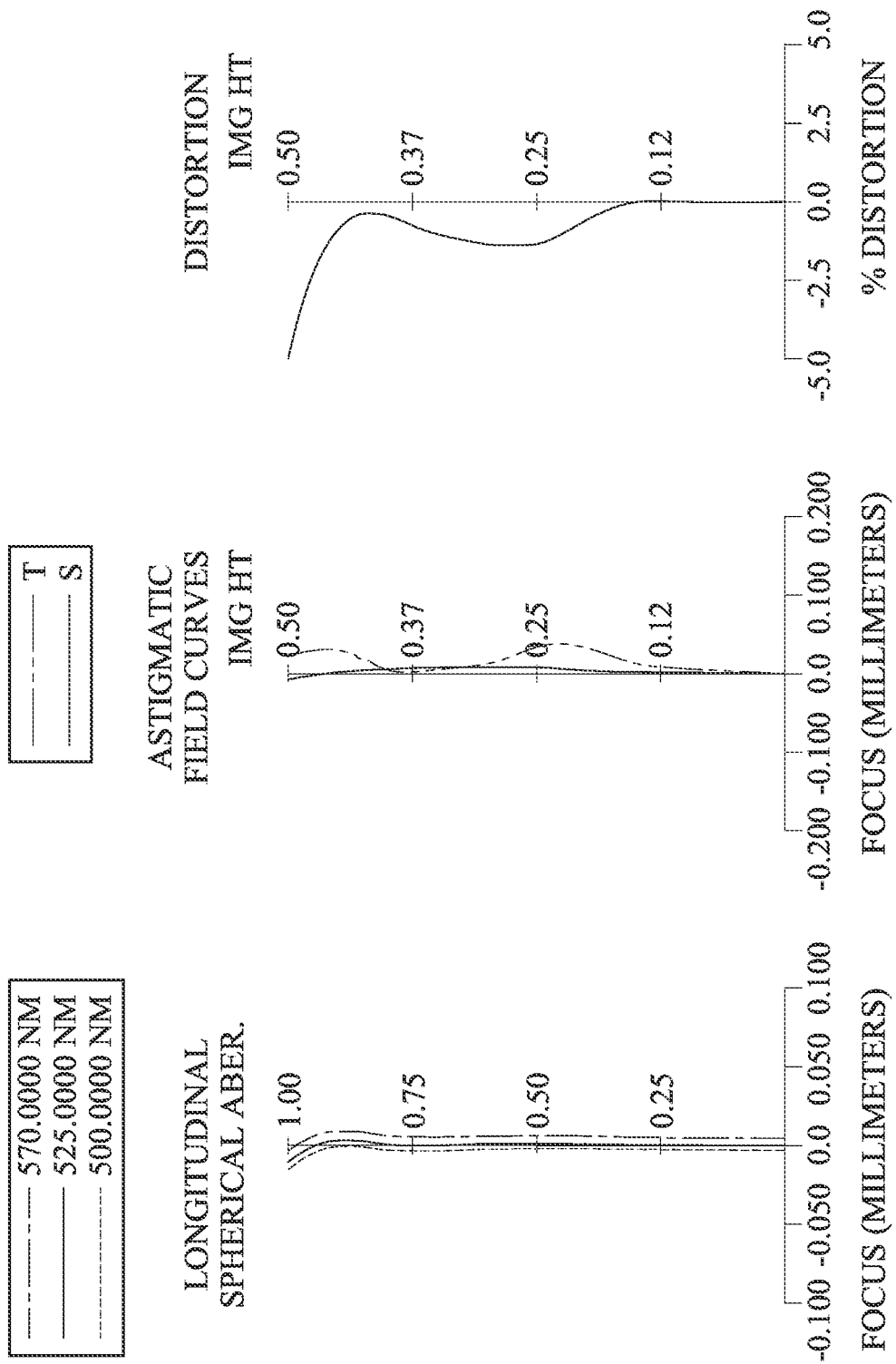
FIG. 9 shows spherical aberration curves, astigmatic field curves and a distortion curve of the image capturing unit according to the 3rd embodiment.

FIG. 7 is a schematic view of an image capturing unit and a light-permeable sheet according to the 3rd embodiment of the present disclosure. FIG. 8 is a schematic view of the image capturing unit in FIG. 7. FIG. 9 shows, in order from left to right, spherical aberration curves, astigmatic field curves and a distortion curve of the image capturing unit according to the 3rd embodiment. In FIG. 7 and FIG. 8, the image capturing unit includes the optical imaging lens assembly (its reference numeral is omitted) of the present disclosure and an image sensor 370. The optical imaging lens assembly includes, in order from an object side to an image side, a first lens element 310, an aperture stop 300, a second lens element 320, a stop 301, a third lens element 330, a filter 350 and an image surface 360. The optical imaging lens assembly includes three lens elements (310, 320 and 330) with no additional lens element disposed between each of the adjacent three lens elements. A light-permeable sheet 340 is disposed between an imaged object O and the optical imaging lens assembly.

The first lens element 310 with negative refractive power has an object-side surface 311 being concave in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has two inflection points. The image-side surface 312 of the first lens element 310 has one inflection point. The object-side surface 311 of the first lens element 310 has one critical point in an off-axis region thereof.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric. The object-side surface 321 of the second lens element 320 has one inflection point. The object-side surface 321 of the second lens element 320 has one critical point in an off-axis region thereof.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric. The object-side surface 331 of the third lens element 330 has two inflection points. The object-side surface 331 of the third lens element 330 has one concave critical point in an off-axis region thereof.

The light-permeable sheet 340 is made of glass material and will not affect the focal length of the optical imaging lens assembly. The filter 350 is made of glass material and located between the third lens element 330 and the image surface 360, and will not affect the focal length of the optical imaging lens assembly. The image sensor 370 is disposed on or near the image surface 360 of the optical imaging lens assembly.

The detailed optical data of the 3rd embodiment are shown in Table 5 and the aspheric surface data are shown in Table 6 below.

TABLE 5

3rd Embodiment
f = 0.34 mm, Fno (work) = 1.51, Fno (inf.) = 1.47, HFOV = 60.6 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.500 | Glass | 1.520 | 64.2 | — |
| 2 | | Plano | | 1.200 | | | | |
| 3 | Lens 1 | −0.436 | (ASP) | 0.250 | Plastic | 1.548 | 56.0 | −0.77 |
| 4 | | 14.852 | (ASP) | 0.516 | | | | |
| 5 | Ape. Stop | Plano | | 0.017 | | | | |
| 6 | Lens 2 | 3.339 | (ASP) | 0.378 | Plastic | 1.548 | 56.0 | 1.76 |
| 7 | | −1.303 | (ASP) | −0.055 | | | | |
| 8 | Stop | Plano | | 0.085 | | | | |
| 9 | Lens 3 | 0.737 | (ASP) | 0.397 | Plastic | 1.548 | 56.0 | 0.71 |
| 10 | | −0.663 | (ASP) | 0.141 | | | | |
| 11 | Filter | Plano | | 0.145 | Glass | 1.520 | 64.2 | — |
| 12 | | Plano | | 0.406 | | | | |
| 13 | Image | Plano | | — | | | | |

Note:
Reference wavelength is 525.0 nm.
The working distance is the axial distance (2.700 mm) between the imaged object 0 (Surface 0) and the object-side surface 311 (Surface 3).
An effective radius of the stop 301 (Surface 8) is 0.373 mm.

TABLE 6

Aspheric Coefficients

| Surface # | 3 | 4 | 6 | 7 | 9 | 10 |
|---|---|---|---|---|---|---|
| k = | −4.1142E+00 | 0.0000E+00 | 0.0000E+00 | −1.8229E+01 | 0.0000E+00 | 0.0000E+00 |
| A4 = | 3.2556E+00 | 4.7410E+00 | 4.2626E−01 | −1.4702E+01 | −1.3522E+01 | 3.0840E+00 |
| A6 = | −1.0404E+01 | −7.9736E+01 | −2.6755E+02 | 2.1493E+02 | 2.6299E+02 | −2.4992E+01 |
| A8 = | 9.7449E+00 | 6.3140E+03 | 9.7871E+03 | −2.9870E+03 | −3.9060E+03 | 2.4598E+02 |
| A10 = | 6.2586E+01 | −1.5071E+05 | −1.9797E+05 | 3.2386E+04 | 3.9361E+04 | −8.0729E+02 |

TABLE 6-continued

Aspheric Coefficients

| Surface # | 3 | 4 | 6 | 7 | 9 | 10 |
|---|---|---|---|---|---|---|
| A12 = | −2.8442E+02 | 1.8456E+06 | 1.8359E+06 | −2.6144E+05 | −2.4813E+05 | −2.6956E+03 |
| A14 = | 5.6251E+02 | −1.2686E+07 | −6.0396E+06 | 1.1830E+06 | 8.4105E+05 | 1.9545E+04 |
| A16 = | −6.1194E+02 | 4.9153E+07 | — | −2.1504E+06 | −1.1449E+06 | −2.7862E+04 |
| A18 = | 3.5452E+02 | −1.0019E+08 | — | — | — | — |
| A20 = | −8.5355E+01 | 8.3515E+07 | — | — | — | — |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 0.34 | TOB + TL [mm] | 4.98 |
| Fno(work) | 1.51 | (TOB + TL)/EPD | 21.65 |
| Fno(inf.) | 1.47 | TOB/TL | 1.18 |
| HFOV [deg.] | 60.6 | R1/EPD | −1.89 |
| V1 | 56.0 | R1/f | −1.29 |
| V2 | 56.0 | f/EPD | 1.47 |
| V3 | 56.0 | f/EPD + cot(HFOV) | 2.04 |
| Vmax-Vmin | 0.0 | |f/f1| | 0.44 |
| ΣCT/ΣAT | 1.82 | |f/f2| | 0.19 |
| ΣCT/CTP | 0.68 | |f/f3| | 0.48 |
| CTP [mm] | 1.50 | FOV [deg.] | 121.3 |
| T12/T23 | 17.77 | Y11/Y32 | 1.83 |
| TL [mm] | 2.28 | Yc11/Y11 | 0.56 |
| TL/EPD | 9.91 | YOB/ImgH | 7.75 |
| TL/f | 6.73 | — | — |

4th Embodiment

Figure 10:
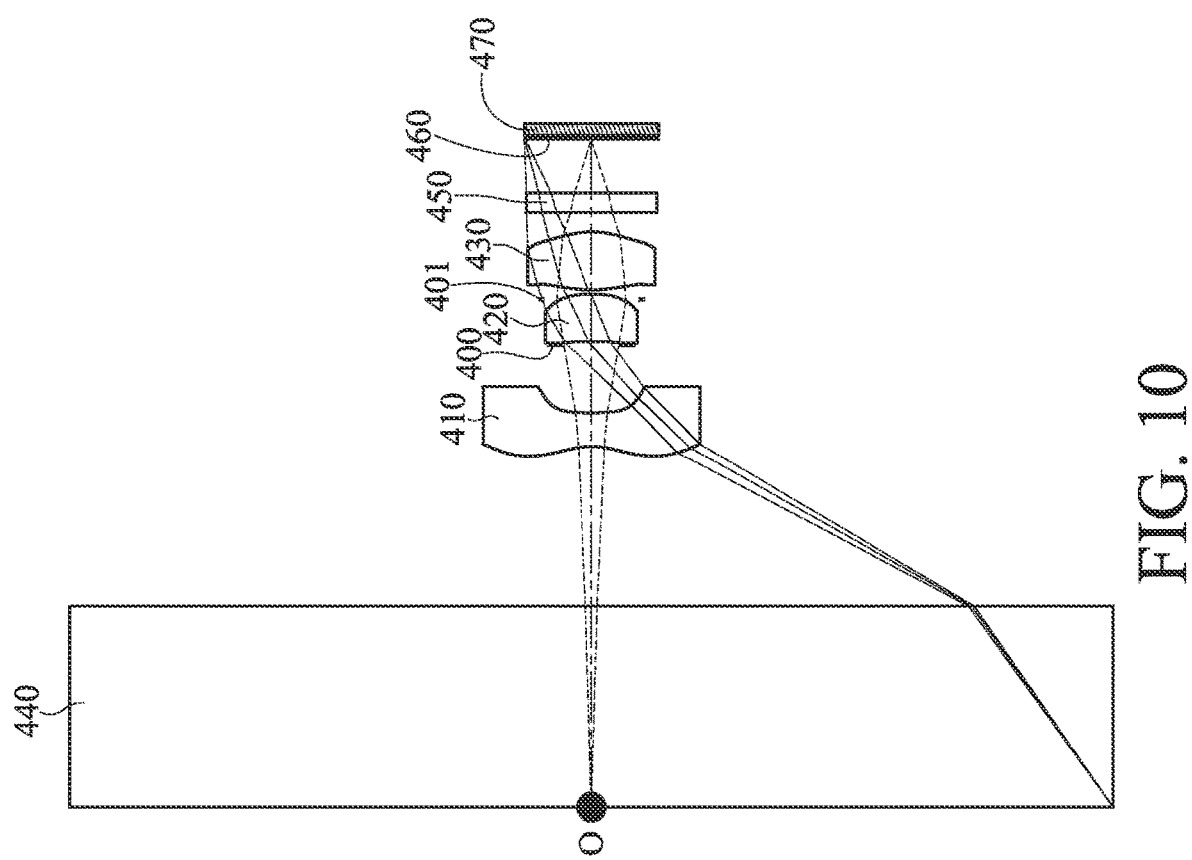
FIG. 10 is a schematic view of an image capturing unit and a light-permeable sheet according to the 4th embodiment of the present disclosure.
Figure 11:
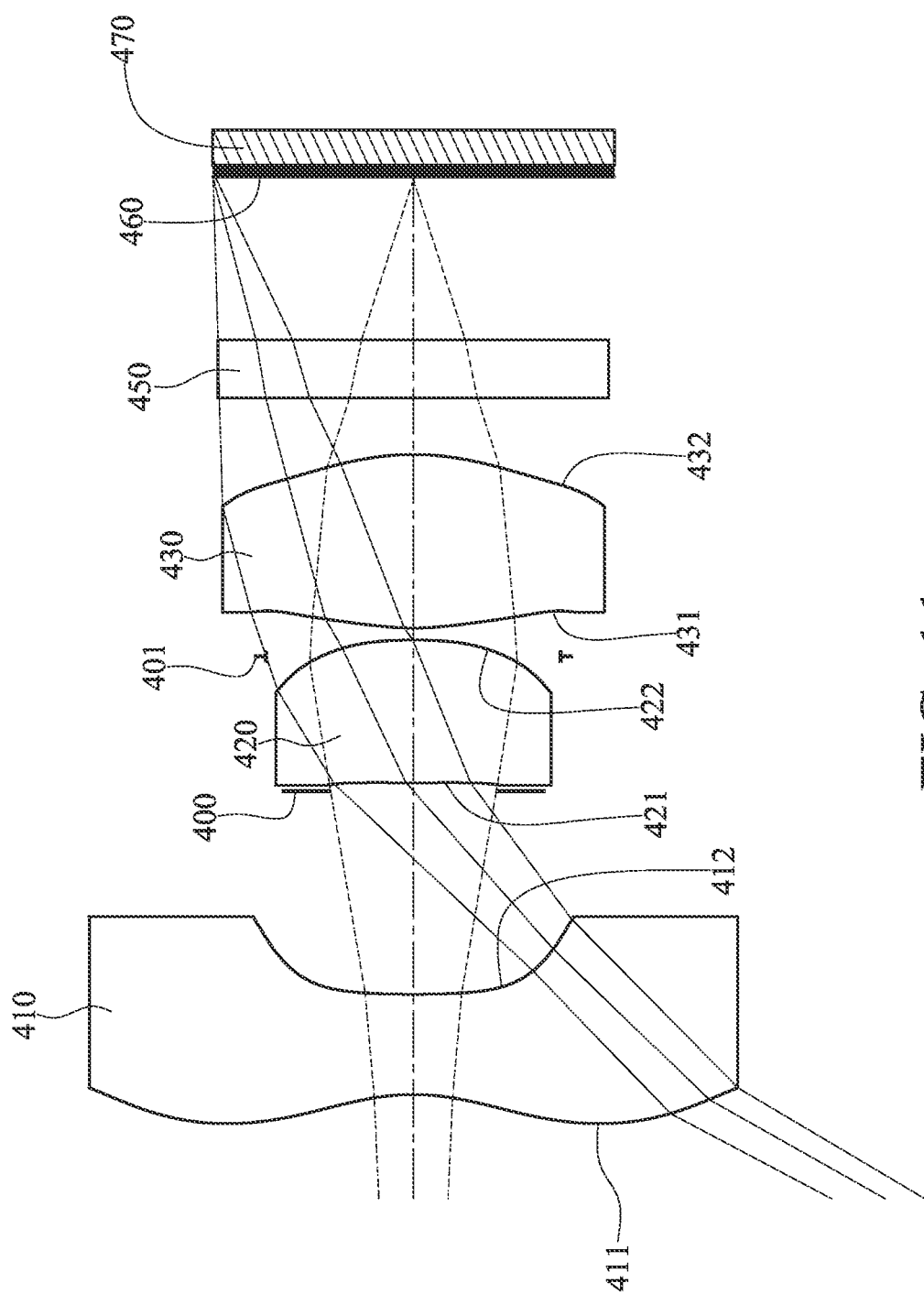
FIG. 11 is a schematic view of the image capturing unit in FIG. 10.
Figure 12:
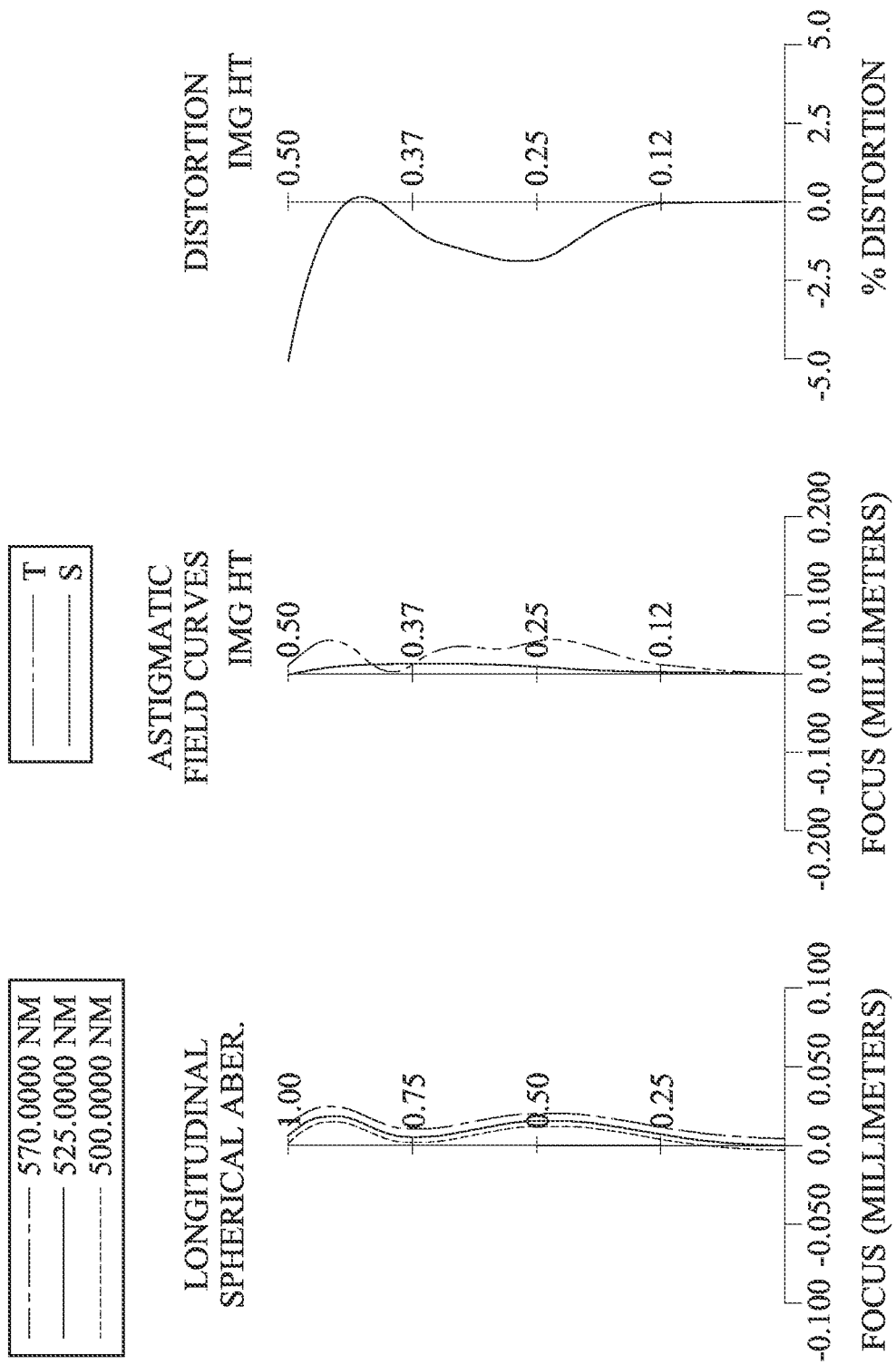
FIG. 12 shows spherical aberration curves, astigmatic field curves and a distortion curve of the image capturing unit according to the 4th embodiment.

FIG. 10 is a schematic view of an image capturing unit and a light-permeable sheet according to the 4th embodiment of the present disclosure. FIG. 11 is a schematic view of the image capturing unit in FIG. 10. FIG. 12 shows, in order from left to right, spherical aberration curves, astigmatic field curves and a distortion curve of the image capturing unit according to the 4th embodiment. In FIG. 10 and FIG. 11, the image capturing unit includes the optical imaging lens assembly (its reference numeral is omitted) of the present disclosure and an image sensor 470. The optical imaging lens assembly includes, in order from an object side to an image side, a first lens element 410, an aperture stop 400, a second lens element 420, a stop 401, a third lens element 430, a filter 450 and an image surface 460. The optical imaging lens assembly includes three lens elements (410, 420 and 430) with no additional lens element disposed between each of the adjacent three lens elements. A light-permeable sheet 440 is disposed between an imaged object O and the optical imaging lens assembly.

The first lens element 410 with negative refractive power has an object-side surface 411 being concave in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has two inflection points. The image-side surface 412 of the first lens element 410 has one inflection point. The object-side surface 411 of the first lens element 410 has one critical point in an off-axis region thereof.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric. The object-side surface 421 of the second lens element 420 has one inflection point. The object-side surface 421 of the second lens element 420 has one critical point in an off-axis region thereof.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric. The object-side surface 431 of the third lens element 430 has one inflection point. The image-side surface 432 of the third lens element 430 has two inflection points. The object-side surface 431 of the third lens element 430 has one concave critical point in an off-axis region thereof.

The light-permeable sheet 440 is made of glass material and will not affect the focal length of the optical imaging lens assembly. The filter 450 is made of glass material and located between the third lens element 430 and the image surface 460, and will not affect the focal length of the optical imaging lens assembly. The image sensor 470 is disposed on or near the image surface 460 of the optical imaging lens assembly.

The detailed optical data of the 4th embodiment are shown in Table 7 and the aspheric surface data are shown in Table 8 below.

TABLE 7

4th Embodiment
f = 0.34 mm, Fno (work) = 1.50, Fno (inf.) = 1.47, HFOV = 60.6 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.500 | Glass | 1.520 | 64.2 | — |
| 2 | | Plano | | 1.193 | | | | |
| 3 | Lens 1 | −0.547 | (ASP) | 0.250 | Plastic | 1.548 | 56.0 | −0.77 |
| 4 | | 2.144 | (ASP) | 0.507 | | | | |
| 5 | Ape. Stop | Plano | | 0.021 | | | | |
| 6 | Lens 2 | 11.897 | (ASP) | 0.356 | Plastic | 1.548 | 56.0 | 2.10 |
| 7 | | −1.262 | (ASP) | −0.041 | | | | |
| 8 | Stop | Plano | | 0.071 | | | | |
| 9 | Lens 3 | 0.670 | (ASP) | 0.433 | Plastic | 1.548 | 56.0 | 0.67 |
| 10 | | −0.631 | (ASP) | 0.141 | | | | |
| 11 | Filter | Plano | | 0.145 | Glass | 1.520 | 64.2 | — |
| 12 | | Plano | | 0.407 | | | | |
| 13 | Image | Plano | | — | | | | |

Note:
Reference wavelength is 525.0 nm.
The working distance is the axial distance (2.693 mm) between the imaged object O (Surface 0) and the object-side surface 411 (Surface 3).
An effective radius of the stop 401 (Surface 8) is 0.367 mm.

TABLE 8

Aspheric Coefficients

| Surface # | 3 | 4 | 6 | 7 | 9 | 10 |
|---|---|---|---|---|---|---|
| k = | −2.7474E+00 | 0.0000E+00 | 0.0000E+00 | −2.6564E+01 | 0.0000E+00 | 0.0000E+00 |
| A4 = | 2.5847E+00 | −3.3982E−01 | 3.7716E−01 | −1.2218E+01 | −1.2259E+01 | 3.0626E+00 |
| A6 = | 8.3383E−01 | 2.3647E+01 | −4.0284E+02 | 1.0437E+02 | 2.1968E+02 | −1.7542E+01 |
| A8 = | −5.6746E+01 | 2.8880E+03 | 2.0833E+04 | −1.1226E+03 | −3.1338E+03 | 1.1424E+02 |
| A10 = | 2.8531E+02 | −6.7930E+04 | 2.5172E+04 | 3.2488E+04 | 5.7786E+02 | 5.7786E+02 |
| A12 = | −7.3981E+02 | 7.2672E+05 | 6.5224E+06 | −3.7852E+05 | −2.1418E+05 | −9.9595E+03 |
| A14 = | 1.1281E+03 | −4.0577E+06 | 2.3890E+06 | 7.4606E+05 | 3.6968E+04 | 3.6968E+04 |
| A16 = | −1.0111E+03 | 1.1268E+07 | — | −5.2416E+06 | −1.0260E+06 | −4.2931E+04 |
| A18 = | 4.8732E+02 | −1.2239E+07 | — | — | — | — |
| A20 = | −9.5583E+01 | — | — | — | — | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 0.34 | TOB + TL [mm] | 4.98 |
| Fno(work) | 1.50 | (TOB + TL)/EPD | 21.66 |
| Fno(inf.) | 1.47 | TOB/TL | 1.18 |
| HFOV [deg.] | 60.6 | R1/EPD | −2.38 |
| V1 | 56.0 | R1/f | −1.62 |
| V2 | 56.0 | f/EPD | 1.47 |
| V3 | 56.0 | f/EPD + cot(HFOV) | 2.04 |
| Vmax−Vmin | 0.0 | |f/f1| | 0.44 |
| ΣCT/ΣAT | 1.86 | |f/f2| | 0.16 |
| ΣCT/CTP | 0.69 | |f/f3| | 0.50 |
| CTP [mm] | 1.50 | FOV [deg.] | 121.2 |
| T12/T23 | 17.60 | Y11/Y32 | 1.70 |

| 4th Embodiment | | | |
|---|---|---|---|
| TL [mm] | 2.29 | Yc11/Y11 | 0.57 |
| TL/EPD | 9.96 | YOB/ImgH | 7.76 |
| TL/f | 6.76 | — | — |

5th Embodiment

Figure 13:
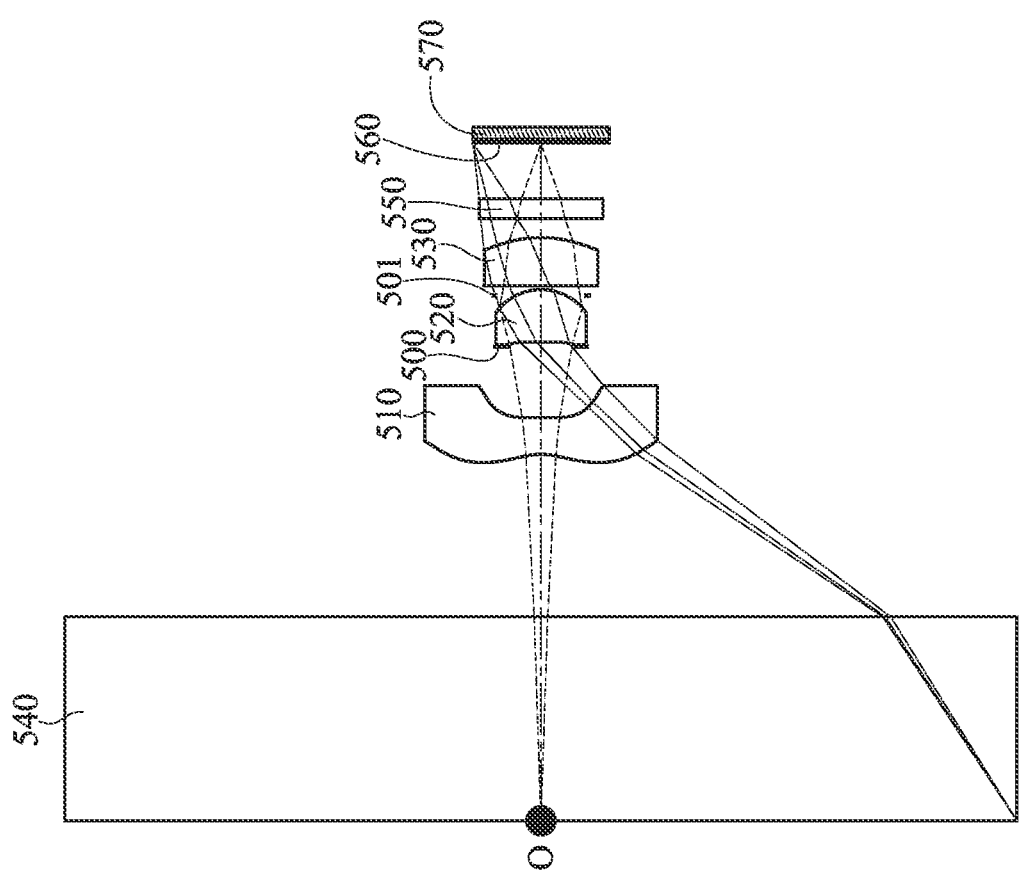
FIG. 13 is a schematic view of an image capturing unit and a light-permeable sheet according to the 5th embodiment of the present disclosure.
Figure 14:
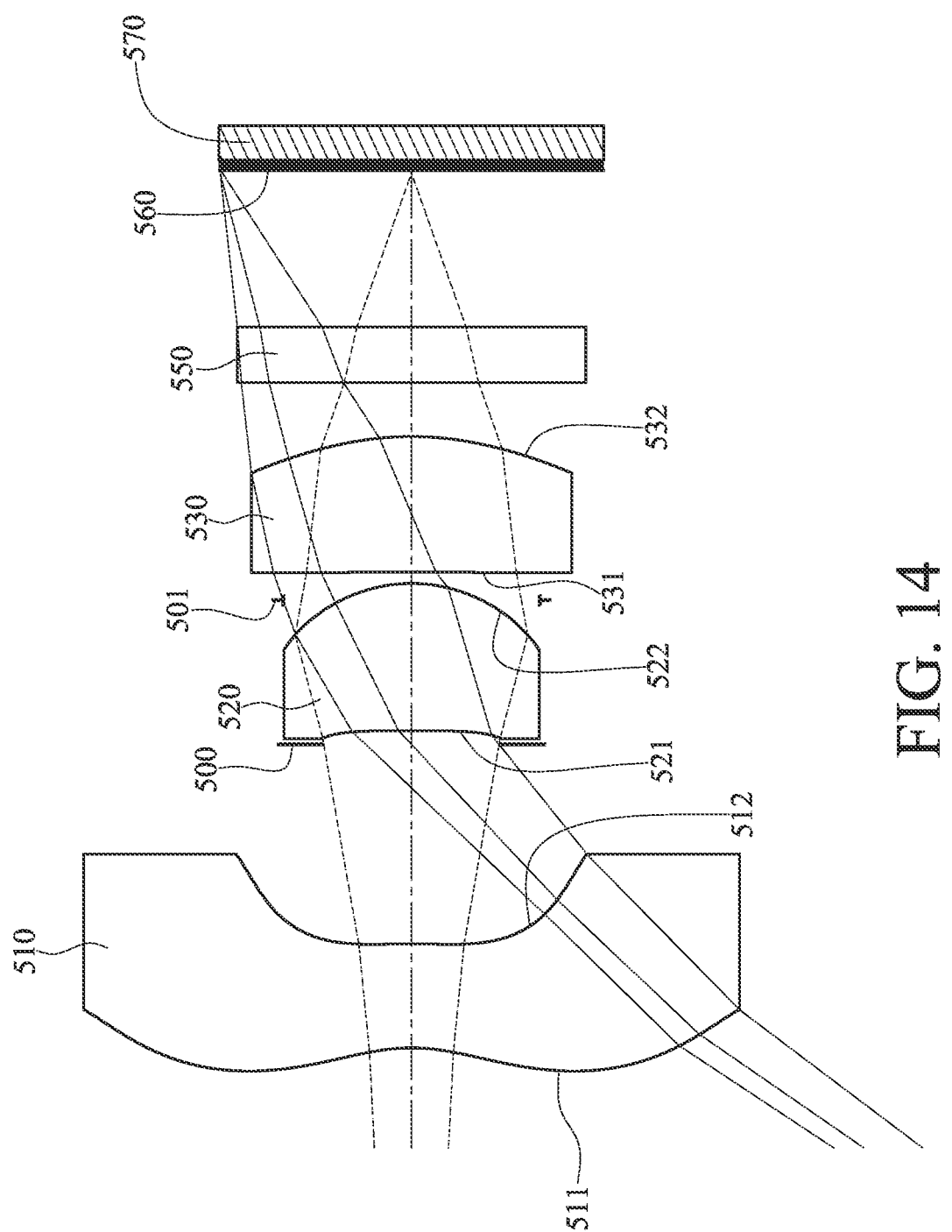
FIG. 14 is a schematic view of the image capturing unit in FIG. 13.
Figure 15:
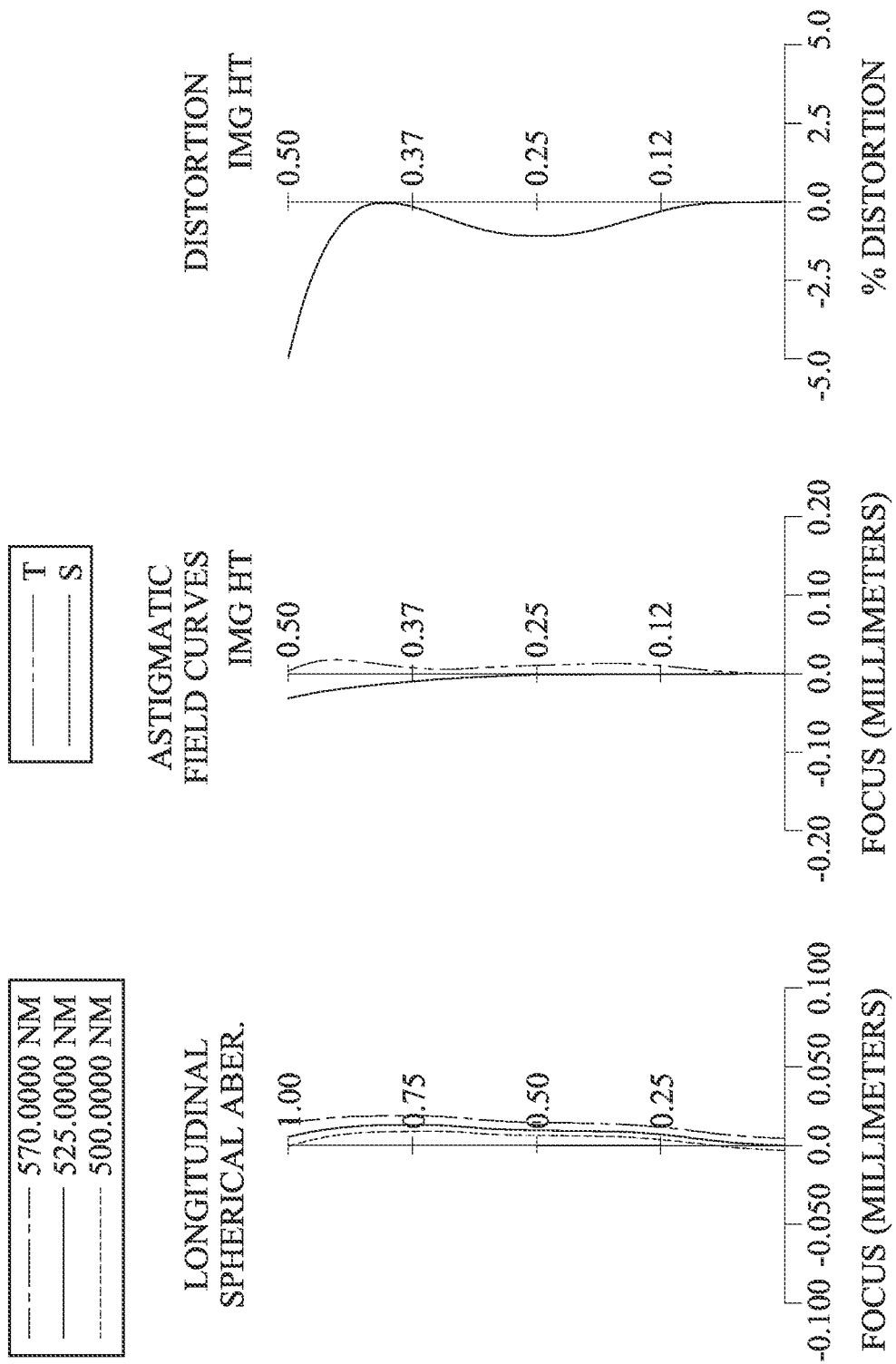
FIG. 15 shows spherical aberration curves, astigmatic field curves and a distortion curve of the image capturing unit according to the 5th embodiment.

FIG. 13 is a schematic view of an image capturing unit and a light-permeable sheet according to the 5th embodiment of the present disclosure. FIG. 14 is a schematic view of the image capturing unit in FIG. 13. FIG. 15 shows, in order from left to right, spherical aberration curves, astigmatic field curves and a distortion curve of the image capturing unit according to the 5th embodiment. In FIG. 13 and FIG. 14, the image capturing unit includes the optical imaging lens assembly (its reference numeral is omitted) of the present disclosure and an image sensor 570. The optical imaging lens assembly includes, in order from an object side to an image side, a first lens element 510, an aperture stop 500, a second lens element 520, a stop 501, a third lens element 530, a filter 550 and an image surface 560. The optical imaging lens assembly includes three lens elements (510, 520 and 530) with no additional lens element disposed between each of the adjacent three lens elements. A light-permeable sheet 540 is disposed between an imaged object O and the optical imaging lens assembly.

The first lens element 510 with negative refractive power has an object-side surface 511 being concave in a paraxial region thereof and an image-side surface 512 being convex in a paraxial region thereof. The first lens element 510 is made of plastic material and has the object-side surface 511 and the image-side surface 512 being both aspheric. The object-side surface 511 of the first lens element 510 has two inflection points. The image-side surface 512 of the first lens element 510 has two inflection points. The object-side surface 511 of the first lens element 510 has one critical point in an off-axis region thereof. The image-side surface 512 of the first lens element 510 has one critical point in an off-axis region thereof.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric. The object-side surface 531 of the third lens element 530 has one inflection point. The object-side surface 531 of the third lens element 530 has one critical point in an off-axis region thereof.

The light-permeable sheet 540 is made of glass material and will not affect the focal length of the optical imaging lens assembly. The filter 550 is made of glass material and located between the third lens element 530 and the image surface 560, and will not affect the focal length of the optical imaging lens assembly. The image sensor 570 is disposed on or near the image surface 560 of the optical imaging lens assembly.

The detailed optical data of the 5th embodiment are shown in Table 9 and the aspheric surface data are shown in Table 10 below.

TABLE 9

5th Embodiment
f = 0.38 mm, Fno (work) = 1.49, Fno (inf.) = 1.44, HFOV = 55.3 deg.

| Surface # |  | Curvature Radius |  | Thickness | Material | Index | Abbe # | Focal Length |
|---|---|---|---|---|---|---|---|---|
| 0 | Object | Plano |  | 0.000 |  |  |  |  |
| 1 | Sheet | Plano |  | 1.500 | Glass | 1.520 | 64.2 | — |
| 2 |  | Plano |  | 1.194 |  |  |  |  |
| 3 | Lens 1 | −0.462 | (ASP) | 0.271 | Plastic | 1.548 | 56.0 | −1.08 |
| 4 |  | −2.586 | (ASP) | 0.520 |  |  |  |  |
| 5 | Ape. Stop | Plano |  | 0.036 |  |  |  |  |
| 6 | Lens 2 | −26.785 | (ASP) | 0.384 | Plastic | 1.548 | 56.0 | 0.72 |
| 7 |  | −0.388 | (ASP) | −0.044 |  |  |  |  |
| 8 | Stop | Plano |  | 0.074 |  |  |  |  |
| 9 | Lens 3 | −6.513 | (ASP) | 0.353 | Plastic | 1.549 | 55.9 | 1.69 |
| 10 |  | −0.826 | (ASP) | 0.141 |  |  |  |  |
| 11 | Filter | Plano |  | 0.145 | Glass | 1.520 | 64.2 | — |
| 12 |  | Plano |  | 0.407 |  |  |  |  |
| 13 | Image | Plano |  | — |  |  |  |  |

Note:
Reference wavelength is 525.0 nm.
The working distance is the axial distance (2.694 mm) between the imaged object O (Surface 0) and the object-side surface 511 (Surface 3).
An effective radius of the stop 501 (Surface 8) is 0.334 mm.

TABLE 10

| | Aspheric Coefficients | | | | | |
|---|---|---|---|---|---|---|
| Surface # | 3 | 4 | 6 | 7 | 9 | 10 |
| k = | −7.3315E+00 | 0.0000E+00 | 0.0000E+00 | −6.6435E+00 | 0.0000E+00 | 0.0000E+00 |
| A4 = | 2.8711E+00 | 9.8086E+00 | −5.2973E+00 | −1.0256E+01 | 2.1517E+00 | 4.3028E−01 |
| A6 = | −1.3303E+01 | −4.8622E+01 | 7.9950E+01 | −4.2852E+01 | 7.0421E+00 | 7.0421E+00 |
| A8 = | 5.2549E+01 | 9.4080E+01 | −5.4282E+03 | −3.2189E+02 | 5.3498E+02 | −1.1447E+02 |
| A10 = | −1.5612E+02 | 7.3215E+03 | 1.2572E+05 | −1.0064E+04 | −3.6438E+03 | 1.1959E+03 |
| A12 = | 3.3558E+02 | −1.4199E+05 | 1.7673E+05 | 8.9542E+03 | −7.7594E+03 | −7.7594E+03 |
| A14 = | −4.9605E+02 | 1.2954E+06 | 5.3911E+06 | −1.1929E+06 | 2.4402E+04 | 2.6320E+04 |
| A16 = | 4.7241E+02 | −6.2122E+06 | — | 2.8798E+06 | −1.2316E+05 | −3.5260E+04 |
| A18 = | −2.6046E+02 | 1.4810E+07 | — | — | — | — |
| A20 = | 6.3093E+01 | −1.3782E+07 | — | — | — | — |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 0.38 | TOB + TL [mm] | 4.98 |
| Fno(work) | 1.49 | (TOB + TL)/EPD | 19.16 |
| Fno(inf.) | 1.44 | TOB/TL | 1.18 |
| HFOV [deg.] | 55.3 | R1/EPD | −1.78 |
| V1 | 56.0 | R1/f | 1.23 |
| V2 | 56.0 | f/EPD | 1.44 |
| V3 | 55.9 | f/EPD + cot(HFOV) | 2.14 |
| Vmax-Vmin | 0.1 | |f/f1| | 0.35 |
| ΣCT/ΣAT | 1.72 | |f/f2| | 0.52 |
| ΣCT/CTP | 0.67 | |f/f3| | 0.22 |
| CTP [mm] | 1.50 | FOV [deg.] | 110.7 |
| T12/T23 | 18.53 | Y11/Y32 | 2.05 |
| TL [mm] | 2.29 | Yc11/Y11 | 0.50 |
| TL/EPD | 8.80 | YOB/ImgH | 6.99 |
| TL/f | 6.09 | — | — |

6th Embodiment

Figure 16:
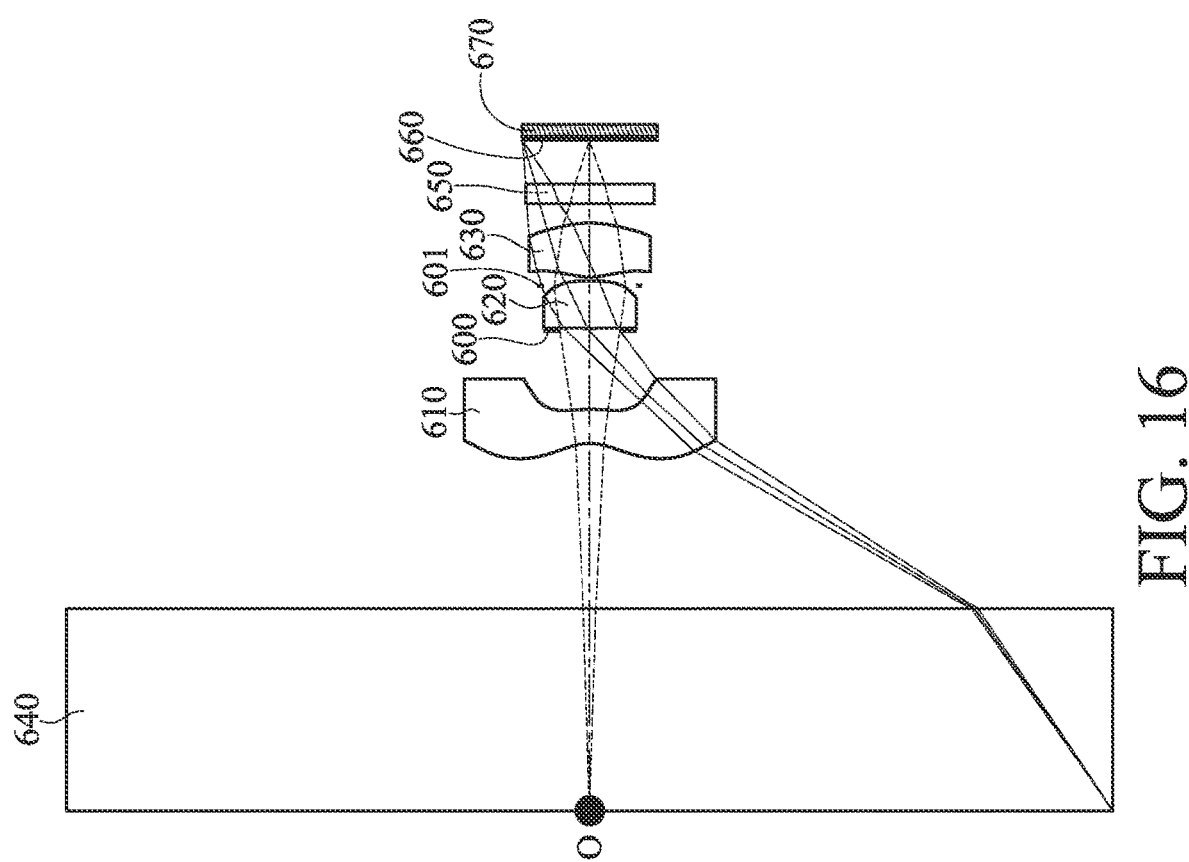
FIG. 16 is a schematic view of an image capturing unit and a light-permeable sheet according to the 6th embodiment of the present disclosure.
Figure 17:
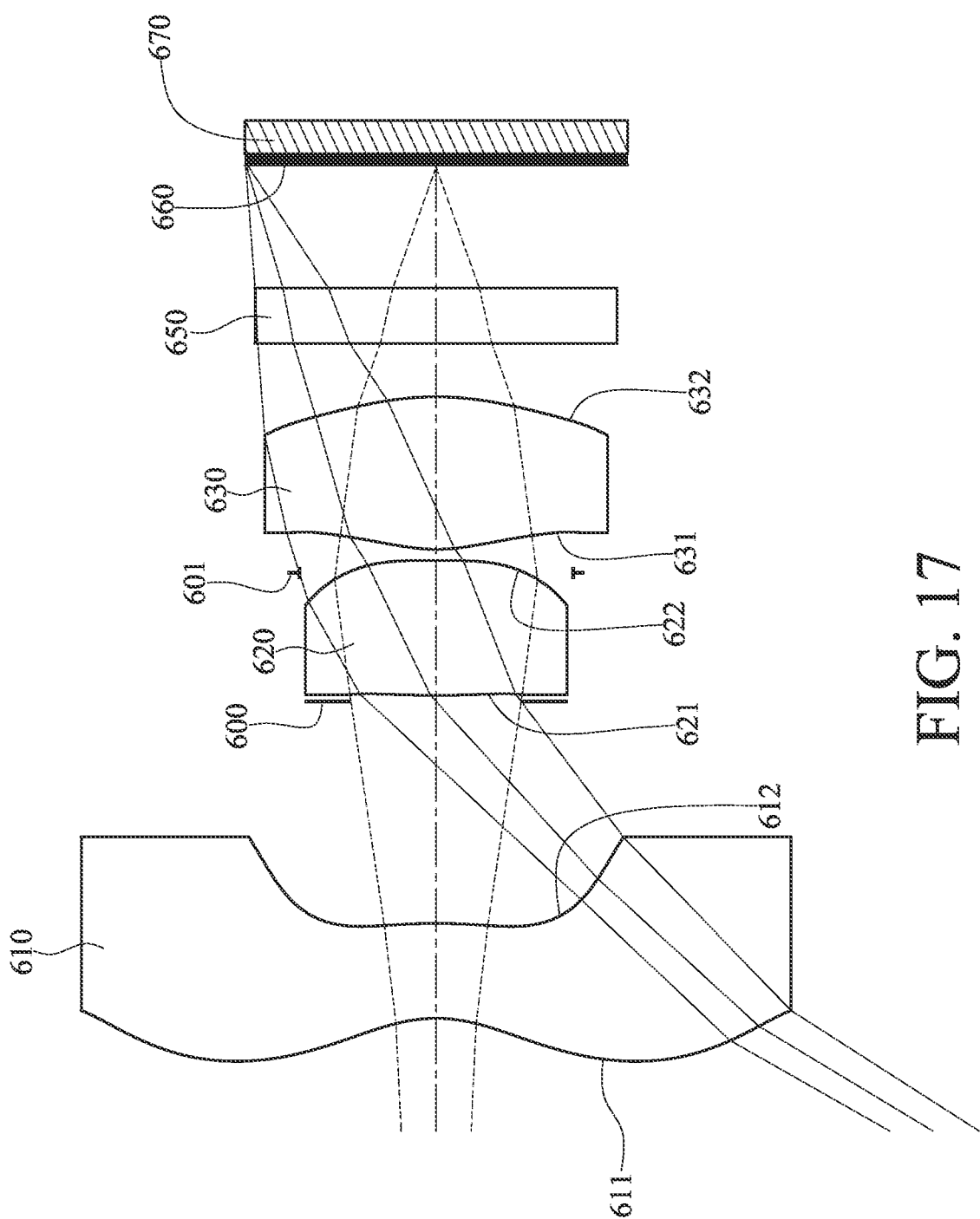
FIG. 17 is a schematic view of the image capturing unit in FIG. 16.
Figure 18:
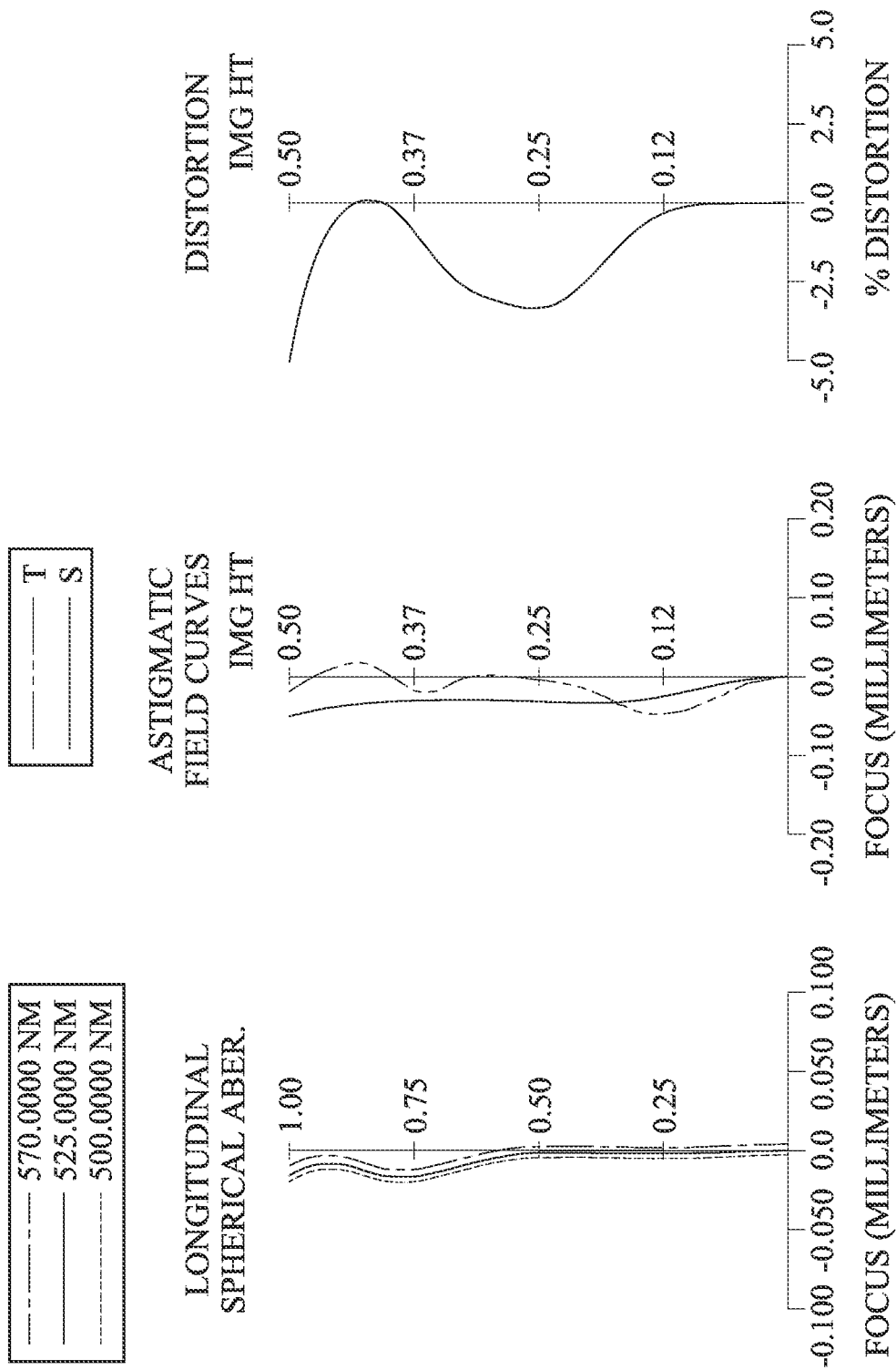
FIG. 18 shows spherical aberration curves, astigmatic field curves and a distortion curve of the image capturing unit according to the 6th embodiment.

FIG. 16 is a schematic view of an image capturing unit and a light-permeable sheet according to the 6th embodiment of the present disclosure. FIG. 17 is a schematic view of the image capturing unit in FIG. 16. FIG. 18 shows, in order from left to right, spherical aberration curves, astigmatic field curves and a distortion curve of the image capturing unit according to the 6th embodiment. In FIG. 16 and FIG. 17, the image capturing unit includes the optical imaging lens assembly (its reference numeral is omitted) of the present disclosure and an image sensor 670. The optical imaging lens assembly includes, in order from an object side to an image side, a first lens element 610, an aperture stop 600, a second lens element 620, a stop 601, a third lens element 630, a filter 650 and an image surface 660. The optical imaging lens assembly includes three lens elements (610, 620 and 630) with no additional lens element disposed between each of the adjacent three lens elements. A light-permeable sheet 640 is disposed between an imaged object O and the optical imaging lens assembly.

The first lens element 610 with negative refractive power has an object-side surface 611 being concave in a paraxial region thereof and an image-side surface 612 being convex in a paraxial region thereof. The first lens element 610 is made of plastic material and has the object-side surface 611 and the image-side surface 612 being both aspheric. The object-side surface 611 of the first lens element 610 has two inflection points. The image-side surface 612 of the first lens element 610 has two inflection points. The object-side surface 611 of the first lens element 610 has one critical point in an off-axis region thereof. The image-side surface 612 of the first lens element 610 has one critical point in an off-axis region thereof.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has one inflection point. The image-side surface 622 of the second lens element 620 has one inflection point. The object-side surface 621 of the second lens element 620 has one critical point in an off-axis region thereof. The image-side surface 622 of the second lens element 620 has one critical point in an off-axis region thereof.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric. The object-side surface 631 of the third lens element 630 has one inflection point. The object-side surface 631 of the third lens element 630 has one concave critical point in an off-axis region thereof.

The light-permeable sheet 640 is made of glass material and will not affect the focal length of the optical imaging lens assembly. The filter 650 is made of glass material and located between the third lens element 630 and the image surface 660, and will not affect the focal length of the optical imaging lens assembly. The image sensor 670 is disposed on or near the image surface 660 of the optical imaging lens assembly.

The detailed optical data of the 6th embodiment are shown in Table 11 and the aspheric surface data are shown in Table 12 below.

TABLE 11

6th Embodiment
f = 0.35 mm, Fno (work) = 1.42, Fno (inf.) = 1.39, HFOV = 58.9 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.500 | Glass | 1.520 | 64.2 | — |
| 2 | | Plano | | 1.230 | | | | |
| 3 | Lens 1 | −0.376 | (ASP) | 0.250 | Plastic | 1.548 | 56.0 | −0.99 |
| 4 | | −1.500 | (ASP) | 0.585 | | | | |
| 5 | Ape. Stop | Plano | | 0.016 | | | | |
| 6 | Lens 2 | 2.019 | (ASP) | 0.355 | Plastic | 1.548 | 56.0 | 6.42 |
| 7 | | 4.444 | (ASP) | −0.032 | | | | |
| 8 | Stop | Plano | | 0.062 | | | | |

TABLE 11-continued

6th Embodiment
f = 0.35 mm, Fno (work) = 1.42, Fno (inf.) = 1.39, HFOV = 58.9 deg.

| Surface # | | Curvature Radius | | Thickness | Material | Index | Abbe # | Focal Length |
|---|---|---|---|---|---|---|---|---|
| 9 | Lens 3 | 0.426 | (ASP) | 0.402 | Plastic | 1.548 | 56.0 | 0.57 |
| 10 | | −0.763 | (ASP) | 0.141 | | | | |
| 11 | Filter | Plano | | 0.145 | Glass | 1.520 | 64.2 | — |
| 12 | | Plano | | 0.325 | | | | |
| 13 | Image | Plano | | — | | | | |

Note:
Reference wavelength is 525.0 nm.
The working distance is the axial distance (2.730 mm) between the imaged object O (Surface 0) and the object-side surface 611 (Surface 3).
An effective radius of the stop 601 (Surface 8) is 0.360 mm.

TABLE 12

Aspheric Coefficients

| Surface # | 3 | 4 | 6 | 7 | 9 | 10 |
|---|---|---|---|---|---|---|
| k = | −9.7679E−01 | 0.0000E+00 | 0.0000E+00 | 0.0000E+00 | 0.0000E+00 | 0.0000E+00 |
| A4 = | 7.2360E+00 | 3.8938E−01 | −4.8910E+00 | −2.8604E+01 | −2.4924E+01 | 9.5915E−01 |
| A6 = | −2.5942E+01 | 1.0277E+02 | 4.2544E+01 | 8.0429E+02 | 5.3332E+02 | 4.5029E+01 |
| A8 = | 6.7172E+01 | −7.1202E+02 | −2.0736E+04 | −1.0110E+04 | −9.6194E+02 | −9.6194E+02 |
| A10 = | −1.1472E+02 | −1.4542E+03 | 3.5633E+05 | 1.2507E+05 | 1.0027E+04 | 1.0027E+04 |
| A12 = | 1.2453E+02 | 4.8952E+04 | 1.0606E+06 | −3.7781E+06 | −9.3031E+05 | −5.6264E+04 |
| A14 = | −8.0696E+01 | −2.7050E+05 | 2.3335E+07 | 3.7070E+06 | 1.5750E+05 | 1.5750E+05 |
| A16 = | 2.7102E+01 | 6.1710E+05 | — | −7.6413E+07 | −6.0887E+06 | −1.7113E+05 |
| A18 = | −3.2583E+00 | −5.1445E+05 | — | 1.0204E+08 | — | — |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 0.35 | TOB + TL [mm] | 4.98 |
| Fno(work) | 1.42 | (TOB + TL)/EPD | 19.92 |
| Fno(inf.) | 1.39 | TOB/TL | 1.21 |
| HFOV [deg.] | 58.9 | R1/EPD | −1.50 |
| V1 | 56.0 | R1/f | −1.08 |
| V2 | 56.0 | f/EPD | 1.39 |
| V3 | 56.0 | f/EPD + cot(HFOV) | 1.99 |
| Vmax−Vmin | 0.0 | |f/f1| | 0.35 |
| ΣCT/ΣAT | 1.60 | |f/f2| | 0.05 |
| ΣCT/CTP | 0.67 | |f/f3| | 0.61 |
| CTP [mm] | 1.50 | FOV [deg.] | 117.9 |
| T12/T23 | 20.03 | Y11/Y32 | 2.07 |
| TL [mm] | 2.25 | Yc11/Y11 | 0.56 |
| TL/EPD | 9.00 | YOB/ImgH | 7.76 |
| TL/f | 6.49 | — | — |

7th Embodiment

Figure 19:
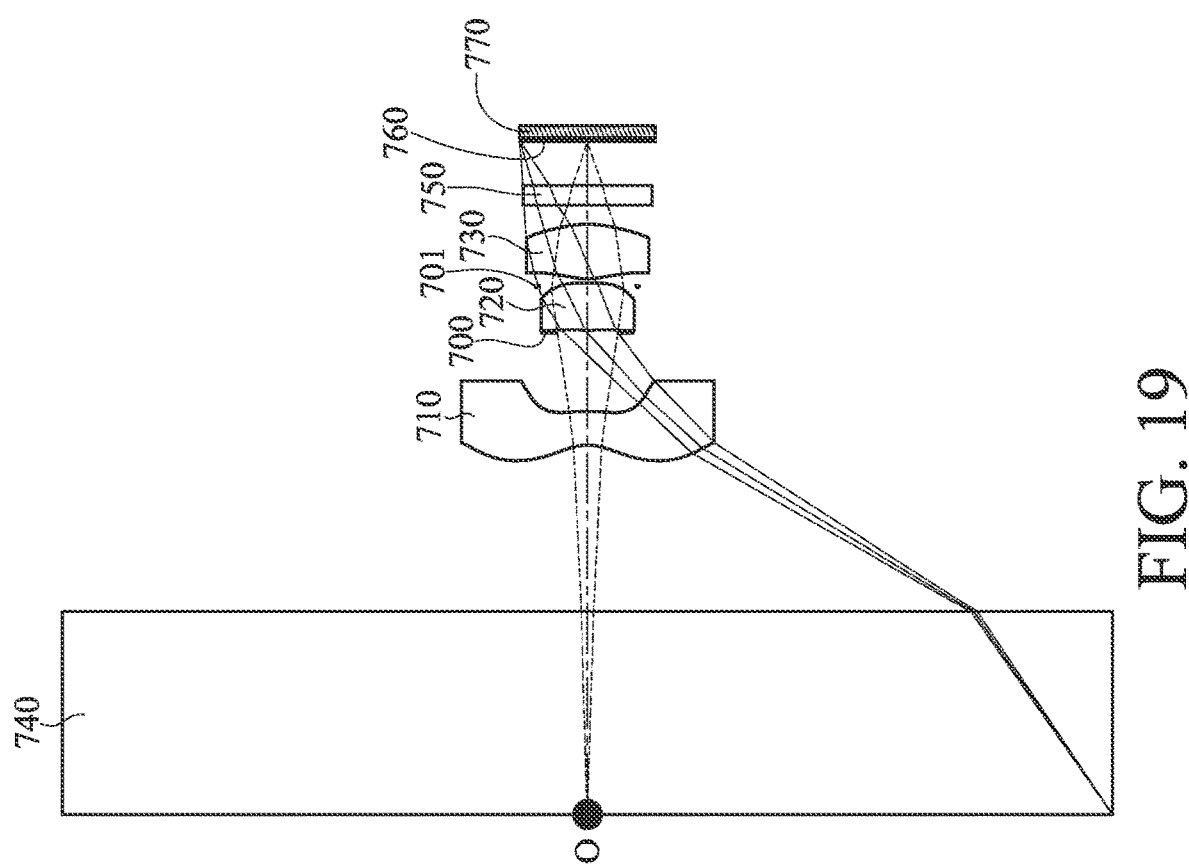
FIG. 19 is a schematic view of an image capturing unit and a light-permeable sheet according to the 7th embodiment of the present disclosure.
Figure 20:
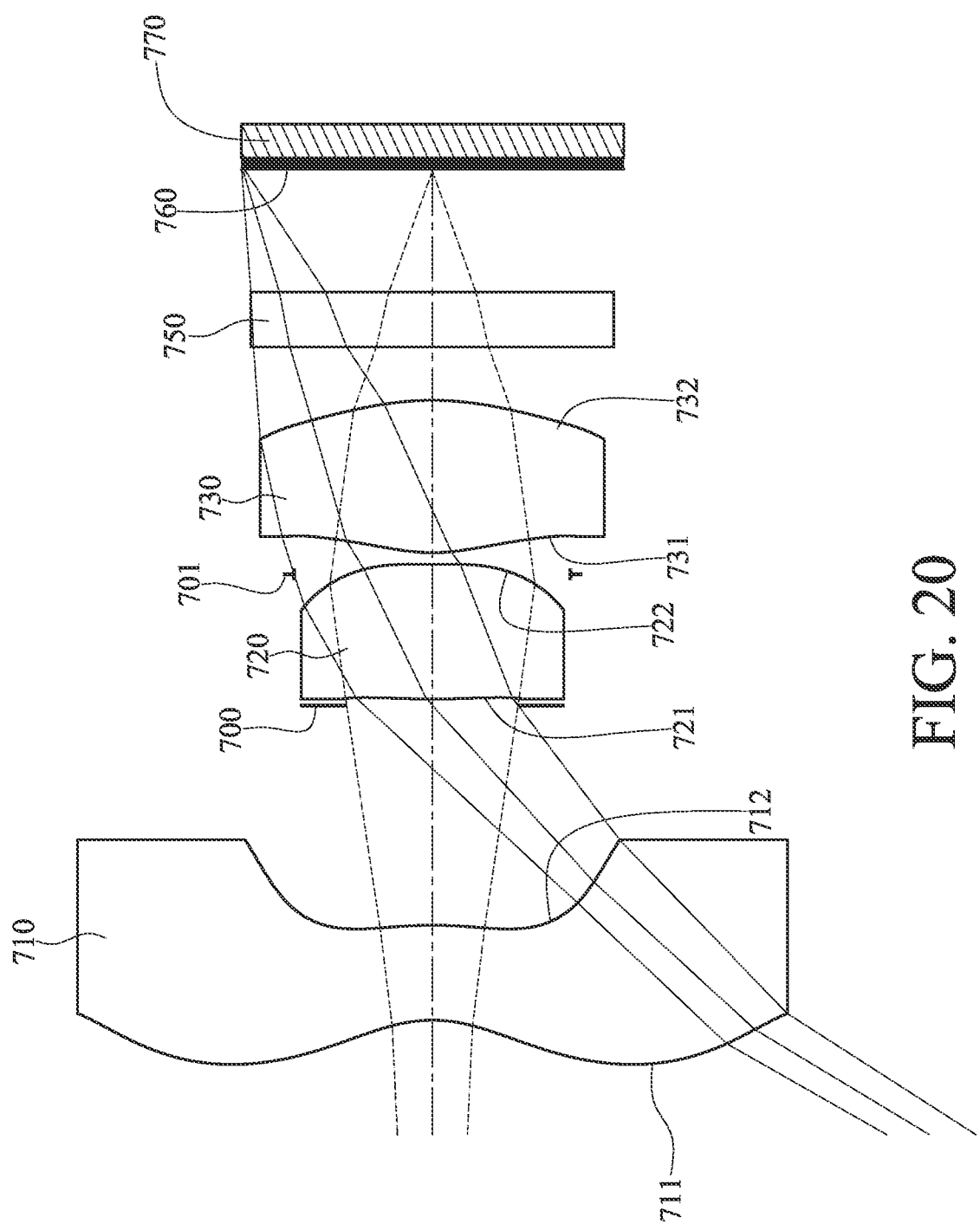
FIG. 20 is a schematic view of the image capturing unit in FIG. 19.
Figure 21:
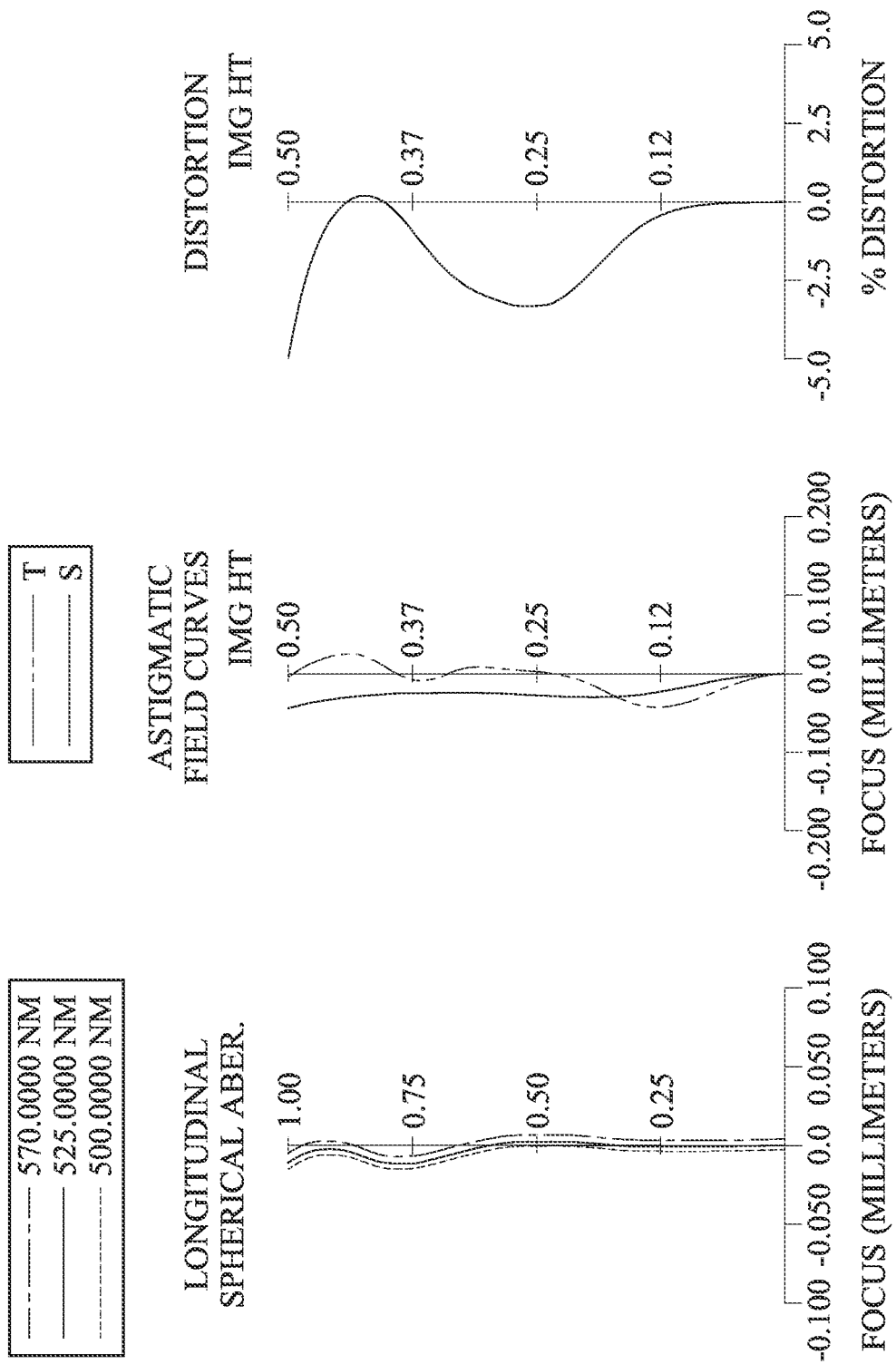
FIG. 21 shows spherical aberration curves, astigmatic field curves and a distortion curve of the image capturing unit according to the 7th embodiment.

FIG. 19 is a schematic view of an image capturing unit and a light-permeable sheet according to the 7th embodiment of the present disclosure. FIG. 20 is a schematic view of the image capturing unit in FIG. 19. FIG. 21 shows, in order from left to right, spherical aberration curves, astigmatic field curves and a distortion curve of the image capturing unit according to the 7th embodiment. In FIG. 19 and FIG. 20, the image capturing unit includes the optical imaging lens assembly (its reference numeral is omitted) of the present disclosure and an image sensor 770. The optical imaging lens assembly includes, in order from an object side to an image side, a first lens element 710, an aperture stop 700, a second lens element 720, a stop 701, a third lens element 730, a filter 750 and an image surface 760. The optical imaging lens assembly includes three lens elements (710, 720 and 730) with no additional lens element disposed between each of the adjacent three lens elements. A light-permeable sheet 740 is disposed between an imaged object O and the optical imaging lens assembly.

The first lens element 710 with negative refractive power has an object-side surface 711 being concave in a paraxial region thereof and an image-side surface 712 being convex in a paraxial region thereof. The first lens element 710 is made of plastic material and has the object-side surface 711 and the image-side surface 712 being both aspheric. The object-side surface 711 of the first lens element 710 has two inflection points. The image-side surface 712 of the first lens element 710 has two inflection points. The object-side surface 711 of the first lens element 710 has one critical point in an off-axis region thereof. The image-side surface 712 of the first lens element 710 has one critical point in an off-axis region thereof.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has one inflection point. The image-side surface 722 of the second lens element 720 has one inflection point.

The object-side surface 721 of the second lens element 720 has one critical point in an off-axis region thereof. The image-side surface 722 of the second lens element 720 has one critical point in an off-axis region thereof.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric. The object-side surface 731 of the third lens element 730 has one inflection point. The image-side surface 732 of the third lens element 730 has one inflection point. The object-side surface 731 of the third lens element 730 has one concave critical point in an off-axis region thereof.

The light-permeable sheet 740 is made of glass material and will not affect the focal length of the optical imaging lens assembly. The filter 750 is made of glass material and located between the third lens element 730 and the image surface 760, and will not affect the focal length of the optical imaging lens assembly. The image sensor 770 is disposed on or near the image surface 760 of the optical imaging lens assembly.

The detailed optical data of the 7th embodiment are shown in Table 13 and the aspheric surface data are shown in Table 14 below.

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 0.35 | TOB + TL [mm] | 4.98 |
| Fno(work) | 1.42 | (TOB + TL)/EPD | 19.92 |
| Fno(inf.) | 1.38 | TOB/TL | 1.22 |
| HFOV [deg.] | 58.9 | R1/EPD | −1.41 |
| V1 | 56.0 | R1/f | −1.02 |
| V2 | 56.0 | f/EPD | 1.38 |
| V3 | 56.0 | f/EPD + cot(HFOV) | 1.98 |
| Vmax-Vmin | 0.0 | |f/f1| | 0.34 |
| ΣCT/ΣAT | 1.61 | |f/f2| | 0.07 |
| ΣCT/CTP | 0.67 | |f/f3| | 0.59 |
| CTP [mm] | 1.50 | FOV [deg.] | 117.8 |

TABLE 13

7th Embodiment
f = 0.35 mm, Fno (work) = 1.42, Fno (inf.) = 1.38, HFOV = 58.9 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.500 | Glass | 1.520 | 64.2 | — |
| 2 | | Plano | | 1.235 | | | | |
| 3 | Lens 1 | −0.352 | (ASP) | 0.250 | Plastic | 1.548 | 56.0 | −1.01 |
| 4 | | −1.204 | (ASP) | 0.580 | | | | |
| 5 | Ape. Stop | Plano | | 0.017 | | | | |
| 6 | Lens 2 | 2.085 | (ASP) | 0.356 | Plastic | 1.548 | 56.0 | 4.65 |
| 7 | | 10.815 | (ASP) | −0.027 | | | | |
| 8 | Stop | Plano | | 0.057 | | | | |
| 9 | Lens 3 | 0.446 | (ASP) | 0.402 | Plastic | 1.548 | 56.0 | 0.58 |
| 10 | | −0.767 | (ASP) | 0.141 | | | | |
| 11 | Filter | Plano | | 0.145 | Glass | 1.520 | 64.2 | — |
| 12 | | Plano | | 0.325 | | | | |
| 13 | Image | Plano | | — | | | | |

Note:
Reference wavelength is 525.0 nm.
The working distance is the axial distance (2.735 mm) between the imaged object O (Surface 0) and the object-side surface 711 (Surface 3).
An effective radius of the stop 701 (Surface 8) is 0.364 mm.

TABLE 14

| Aspheric Coefficients | | | | | | |
|---|---|---|---|---|---|---|
| Surface # | 3 | 4 | 6 | 7 | 9 | 10 |
| k = | −2.6744E+00 | 0.0000E+00 | 0.0000E+00 | 0.0000E+00 | 0.0000E+00 | 0.0000E+00 |
| A4 = | 4.0273E+00 | 2.0226E+00 | −4.5804E+00 | −2.6082E+01 | −2.2819E+01 | 8.8871E−01 |
| A6 = | −1.5893E+01 | 8.1721E+01 | −1.4527E+00 | 7.0936E+02 | 4.7411E+02 | 4.6866E+01 |
| A8 = | 4.1513E+01 | −5.4474E+02 | −1.8115E+04 | −8.7964E+03 | −1.0048E+03 | −1.0048E+03 |
| A10 = | −6.8417E+01 | −2.2335E+03 | 3.0732E+05 | 1.0689E+05 | 1.0471E+04 | 1.0471E+04 |
| A12 = | 6.8890E+01 | 5.1060E+04 | 1.5337E+06 | −3.1980E+06 | −7.7845E+05 | −5.8463E+04 |
| A14 = | −3.8724E+01 | −2.7369E+05 | 1.9282E+07 | 3.0249E+06 | 1.6269E+05 | 1.6269E+05 |
| A16 = | 9.2113E+00 | 6.1955E+05 | — | −6.1371E+07 | −4.8133E+06 | −1.7584E+05 |
| A18 = | 1.9837E−02 | −5.1518E+05 | — | 7.9516E+07 | — | — |

-continued

| 7th Embodiment | | | |
|---|---|---|---|
| T12/T23 | 19.90 | Y11/Y32 | 2.06 |
| TL [mm] | 2.25 | Yc11/Y11 | 0.57 |
| TL/EPD | 8.98 | YOB/ImgH | 7.76 |
| TL/f | 6.50 | — | — |

8th Embodiment

Figure 22:
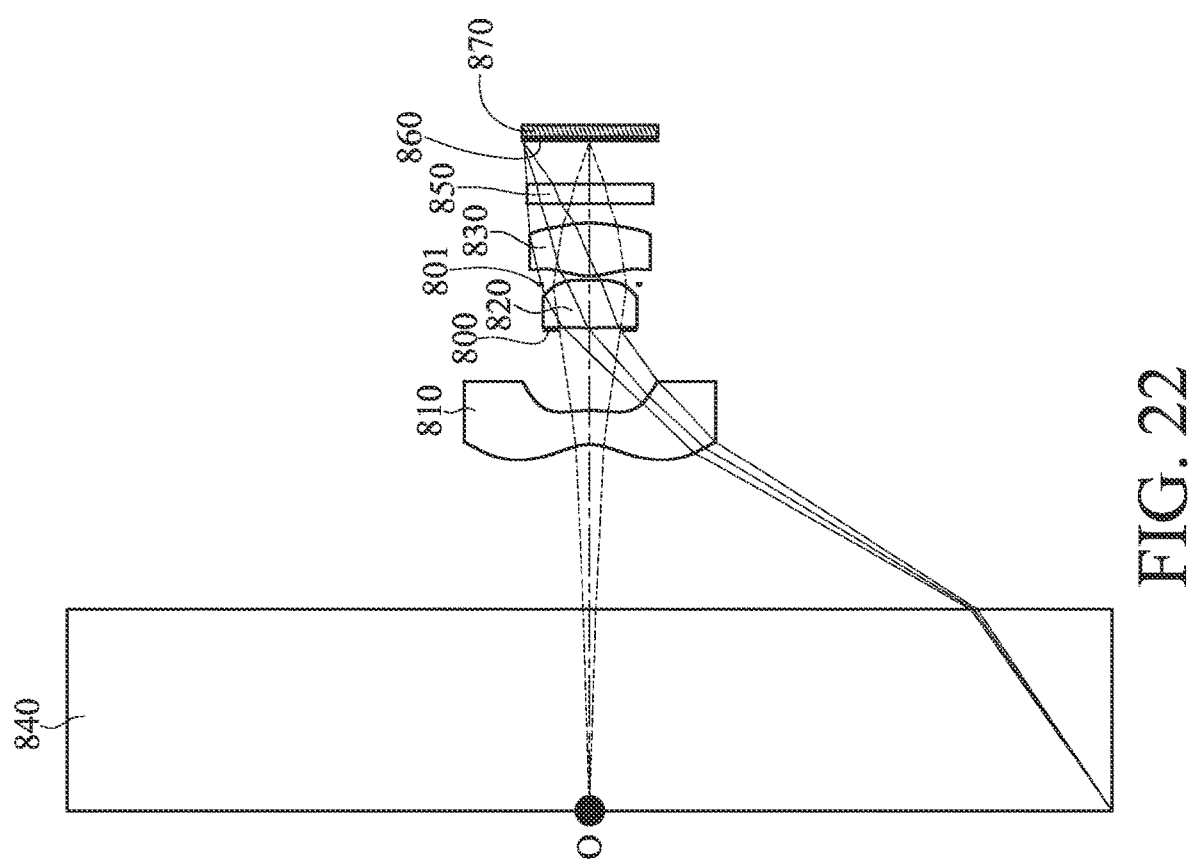
FIG. 22 is a schematic view of an image capturing unit and a light-permeable sheet according to the 8th embodiment of the present disclosure.
Figure 23:
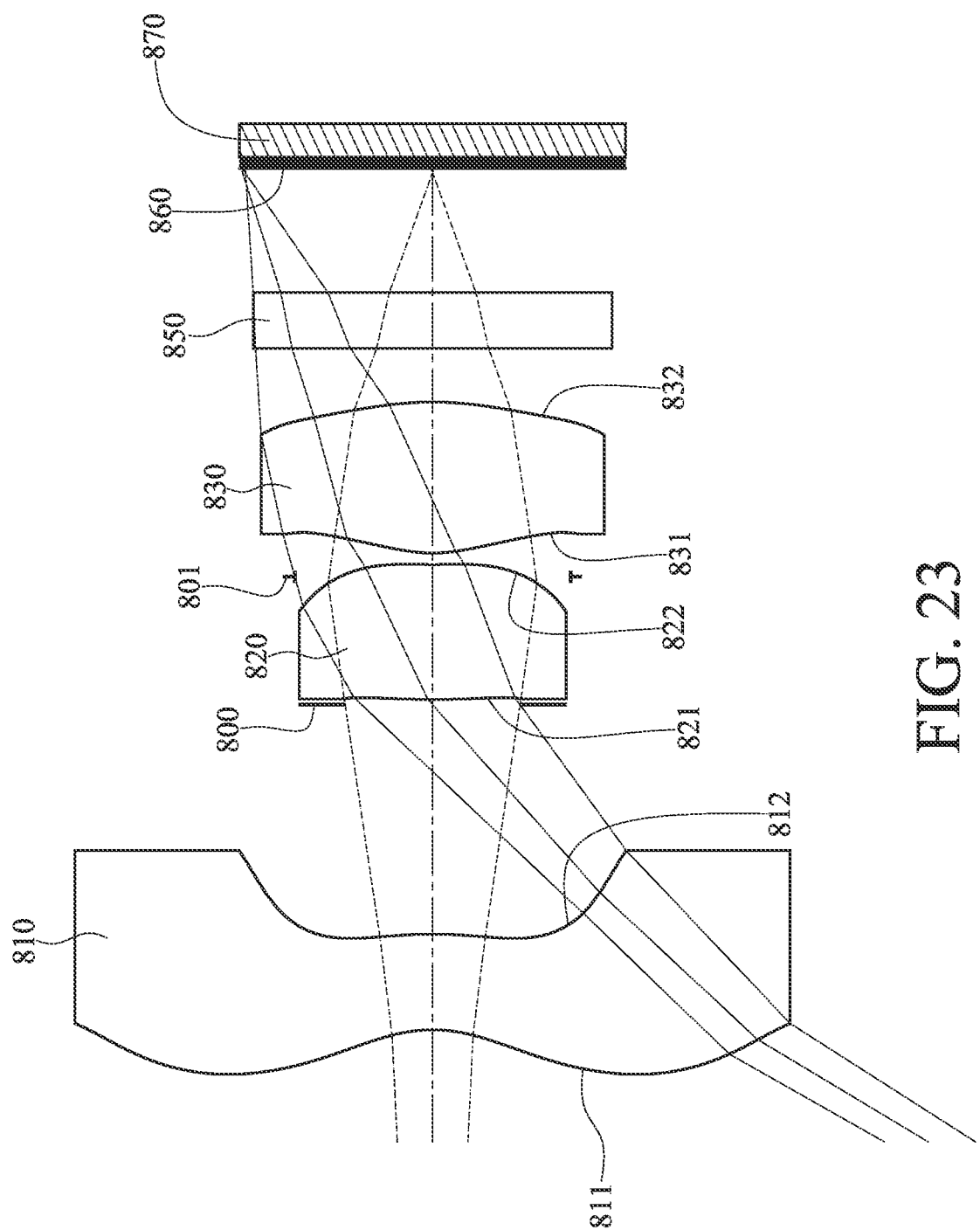
FIG. 23 is a schematic view of the image capturing unit in FIG. 22.
Figure 24:
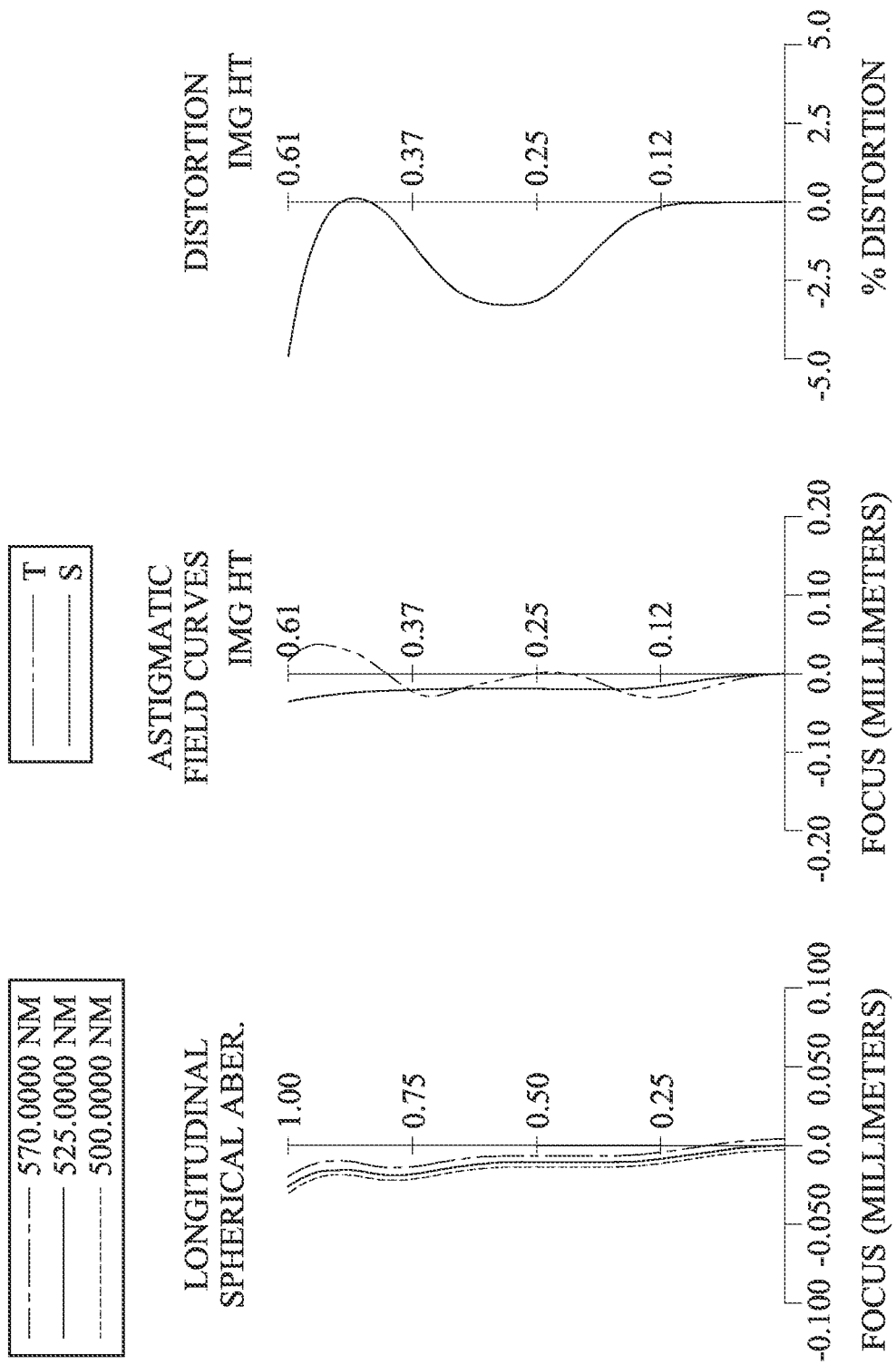
FIG. 24 shows spherical aberration curves, astigmatic field curves and a distortion curve of the image capturing unit according to the 8th embodiment.

FIG. 22 is a schematic view of an image capturing unit and a light-permeable sheet according to the 8th embodiment of the present disclosure. FIG. 23 is a schematic view of the image capturing unit in FIG. 22. FIG. 24 shows, in order from left to right, spherical aberration curves, astigmatic field curves and a distortion curve of the image capturing unit according to the 8th embodiment. In FIG. 22 and FIG. 23, the image capturing unit includes the optical imaging lens assembly (its reference numeral is omitted) of the present disclosure and an image sensor 870. The optical imaging lens assembly includes, in order from an object side to an image side, a first lens element 810, an aperture stop 800, a second lens element 820, a stop 801, a third lens element 830, a filter 850 and an image surface 860. The optical imaging lens assembly includes three lens elements (810, 820 and 830) with no additional lens element disposed between each of the adjacent three lens elements. A light-permeable sheet 840 is disposed between an imaged object O and the optical imaging lens assembly.

The first lens element 810 with negative refractive power has an object-side surface 811 being concave in a paraxial region thereof and an image-side surface 812 being convex in a paraxial region thereof. The first lens element 810 is made of glass material and has the object-side surface 811 and the image-side surface 812 being both aspheric. The object-side surface 811 of the first lens element 810 has two inflection points. The image-side surface 812 of the first lens element 810 has two inflection points. The object-side surface 811 of the first lens element 810 has one critical point in an off-axis region thereof. The image-side surface 812 of the first lens element 810 has one critical point in an off-axis region thereof.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has one inflection point. The image-side surface 822 of the second lens element 820 has one inflection point. The object-side surface 821 of the second lens element 820 has one critical point in an off-axis region thereof. The image-side surface 822 of the second lens element 820 has one critical point in an off-axis region thereof.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric. The object-side surface 831 of the third lens element 830 has two inflection points. The object-side surface 831 of the third lens element 830 has one concave critical point in an off-axis region thereof.

The light-permeable sheet 840 is made of glass material and will not affect the focal length of the optical imaging lens assembly. The filter 850 is made of glass material and located between the third lens element 830 and the image surface 860, and will not affect the focal length of the optical imaging lens assembly. The image sensor 870 is disposed on or near the image surface 860 of the optical imaging lens assembly.

The detailed optical data of the 8th embodiment are shown in Table 15 and the aspheric surface data are shown in Table 16 below.

TABLE 15

8th Embodiment
f = 0.35 mm, Fno (work) = 1.42, Fno (inf.) = 1.38, HFOV = 59.0 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.500 | Glass | 1.520 | 64.2 | — |
| 2 | | Plano | | 1.226 | | | | |
| 3 | Lens 1 | −0.369 | (ASP) | 0.250 | Glass | 1.595 | 60.61 | −1.01 |
| 4 | | −1.191 | (ASP) | 0.600 | | | | |
| 5 | Ape. Stop | Plano | | 0.014 | | | | |
| 6 | Lens 2 | 2.072 | (ASP) | 0.353 | Plastic | 1.548 | 56.0 | −34.60 |
| 7 | | 1.755 | (ASP) | −0.032 | | | | |
| 8 | Stop | Plano | | 0.062 | | | | |
| 9 | Lens 3 | 0.368 | (ASP) | 0.395 | Plastic | 1.548 | 56.0 | 0.53 |
| 10 | | −0.825 | (ASP) | 0.141 | | | | |
| 11 | Filter | Plano | | 0.145 | Glass | 1.520 | 64.2 | — |
| 12 | | Plano | | 0.325 | | | | |
| 13 | Image | Plano | | — | | | | |

Note:
Reference wavelength is 525.0 nm.
The working distance is the axial distance (2.726 mm) between the imaged object O (Surface 0) and the object-side surface 811 (Surface 3).
An effective radius of the stop 801 (Surface 8) is 0.360 mm.

TABLE 16

Aspheric Coefficients

| Surface # | 3 | 4 | 6 | 7 | 9 | 10 |
|---|---|---|---|---|---|---|
| k = | −9.8044E−01 | 0.0000E+00 | −5.3723E+00 | 0.0000E+00 | −3.0186E−01 | 0.0000E+00 |
| A4 = | 7.4724E+00 | 2.0516E+00 | −1.8068E+00 | −2.9561E+01 | 3.0421E+00 | 3.0421E+00 |
| A6 = | −2.7854E+01 | 4.4099E+01 | −1.0347E+02 | 9.3900E+02 | 6.5691E+02 | −5.1588E+00 |
| A8 = | 7.6052E+01 | 2.3320E+02 | 4.3079E+03 | −1.2044E+04 | −2.5079E+02 | −2.5079E+02 |
| A10 = | −1.3997E+02 | −1.0133E+04 | −9.3515E+04 | 3.3691E+05 | 1.4185E+05 | 4.5769E+03 |
| A12 = | 1.6847E+02 | 9.3861E+04 | 8.2898E+05 | −1.0037E+06 | −3.4964E+04 | −3.4964E+04 |
| A14 = | −1.2580E+02 | −3.9837E+05 | −2.4335E+06 | 1.8881E+07 | 3.7959E+06 | 1.1813E+05 |
| A16 = | 5.2050E+01 | 8.0408E+05 | — | −5.7843E+07 | −5.8743E+06 | −1.4497E+05 |
| A18 = | −8.9777E+00 | −6.2437E+05 | — | 7.2207E+07 | — | — |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 0.35 | TOB + TL [mm] | 4.98 |
| Fno(work) | 1.42 | (TOB + TL)/EPD | 19.92 |
| Fno(inf.) | 1.38 | TOB/TL | 1.21 |
| HFOV [deg.] | 59.0 | R1/EPD | −1.47 |
| V1 | 60.6 | R1/f | −1.06 |
| V2 | 56.0 | f/EPD | 1.38 |
| V3 | 56.0 | f/EPD + cot(HFOV) | 1.99 |
| Vmax−Vmin | 4.6 | |f/f1| | 0.34 |
| ΣCT/ΣAT | 1.55 | |f/f2| | 0.01 |
| ΣCT/CTP | 0.67 | |f/f3| | 0.66 |
| CTP [mm] | 1.50 | FOV [deg.] | 118.1 |
| T12/T23 | 20.47 | Y11/Y32 | 2.08 |
| TL [mm] | 2.25 | Yc11/Y11 | 0.57 |
| TL/EPD | 9.01 | YOB/ImgH | 7.75 |
| TL/f | 6.51 | — | — |

9th Embodiment

Figure 25:
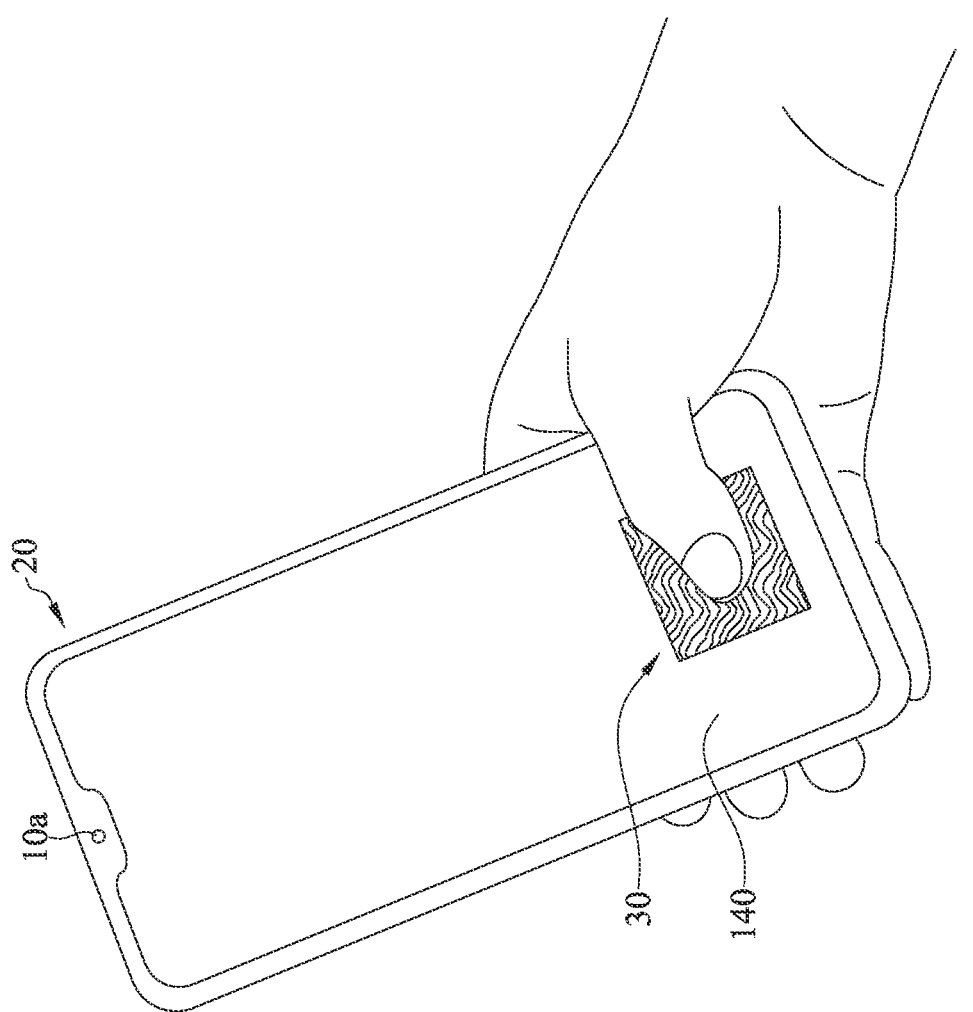
FIG. 25 is a perspective view of an electronic device according to the 9th embodiment of the present disclosure.
Figure 26:
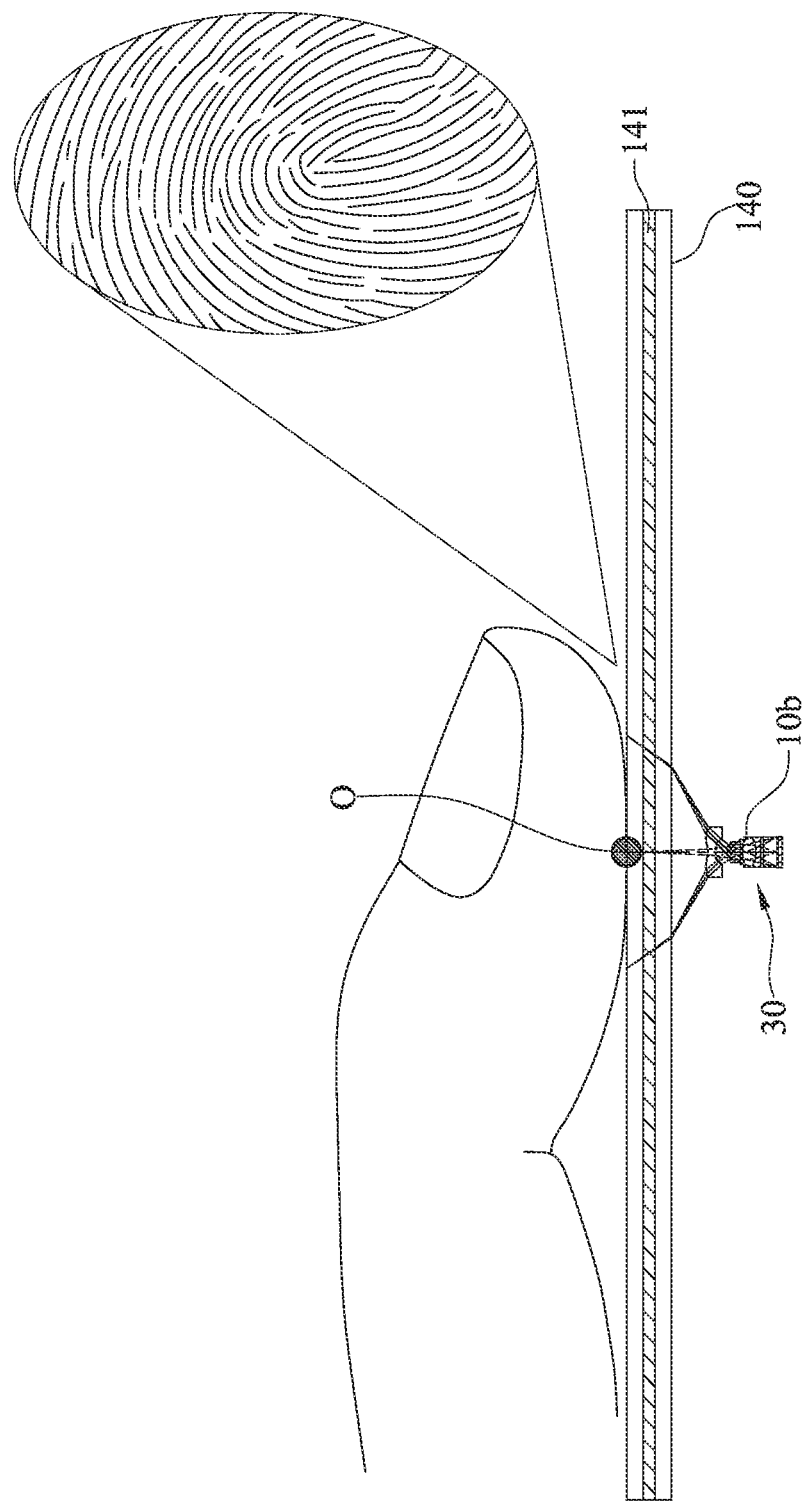
FIG. 26 is a schematic view of the electronic device in FIG. 25 identifying a fingerprint.

FIG. 25 is a perspective view of an electronic device according to the 9th embodiment of the present disclosure. FIG. 26 is a schematic view of the electronic device in FIG. 25 identifying a fingerprint.

In this embodiment, an electronic device 20 is a smartphone having a biometric identification function. The electronic device 20 includes a fingerprint identification module 30, an image capturing unit 10a and the light-permeable sheet 140 disclosed in the 1st embodiment. The image capturing unit 10a is a front-facing camera of the electronic device 20 for taking selfies, and the image capturing unit 10a includes the optical imaging lens assembly of the present disclosure and an image sensor. The fingerprint identification module 30 has a fingerprint identification function, which includes an image capturing unit 10b. The image capturing unit 10b includes the optical imaging lens assembly of the present disclosure and an image sensor. In this embodiment, each of the image capturing units 10a and 10b is the image capturing unit disclosed in the 1st embodiment, but the present disclosure is not limited thereto. For example, in some configurations, only one of the image capturing units 10a and 10b includes the optical imaging lens assembly of the present disclosure.

The light-permeable sheet 140 includes a display layer 141 which can also provide protection to the screen, thereby minimizing the use of additional components. Light rays can travel through the display layer 141 into the optical imaging lens assembly of the fingerprint identification module 30 for wider applications. The display layer 141 has a touch-screen function, such that there is no need of additional input devices, and it's favorable for making the operation more intuitive. Furthermore, the display layer 141 may be an OLED display layer or an active-matrix organic light-emitting diode (AMOLED) display layer, such that the display layer 141 can be a light source for illuminating the imaged object O, thereby saving additional light sources.

10th Embodiment

Figure 27:
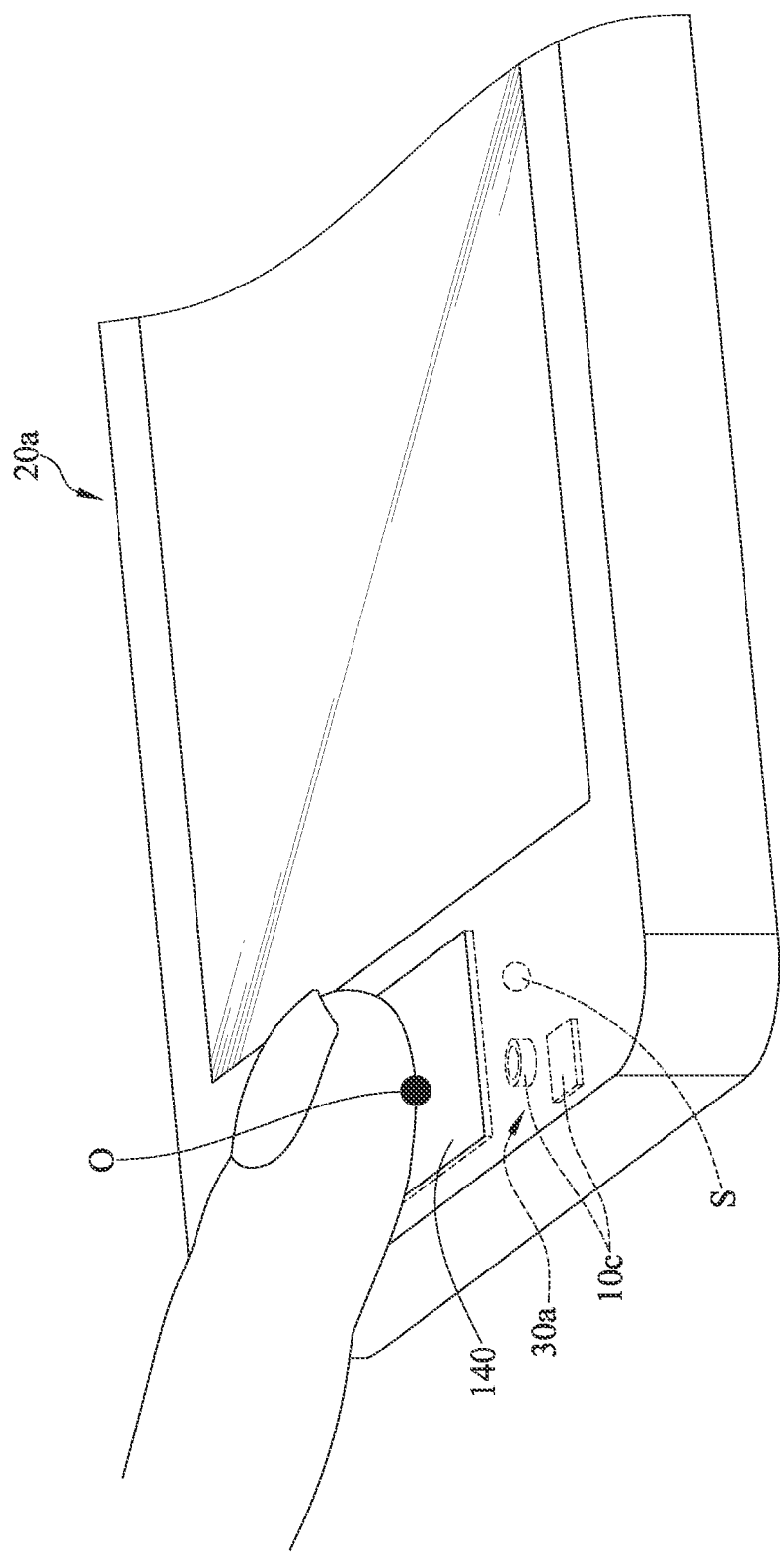
FIG. 27 is a perspective view of an electronic device according to the 10th embodiment of the present disclosure.
Figure 28:
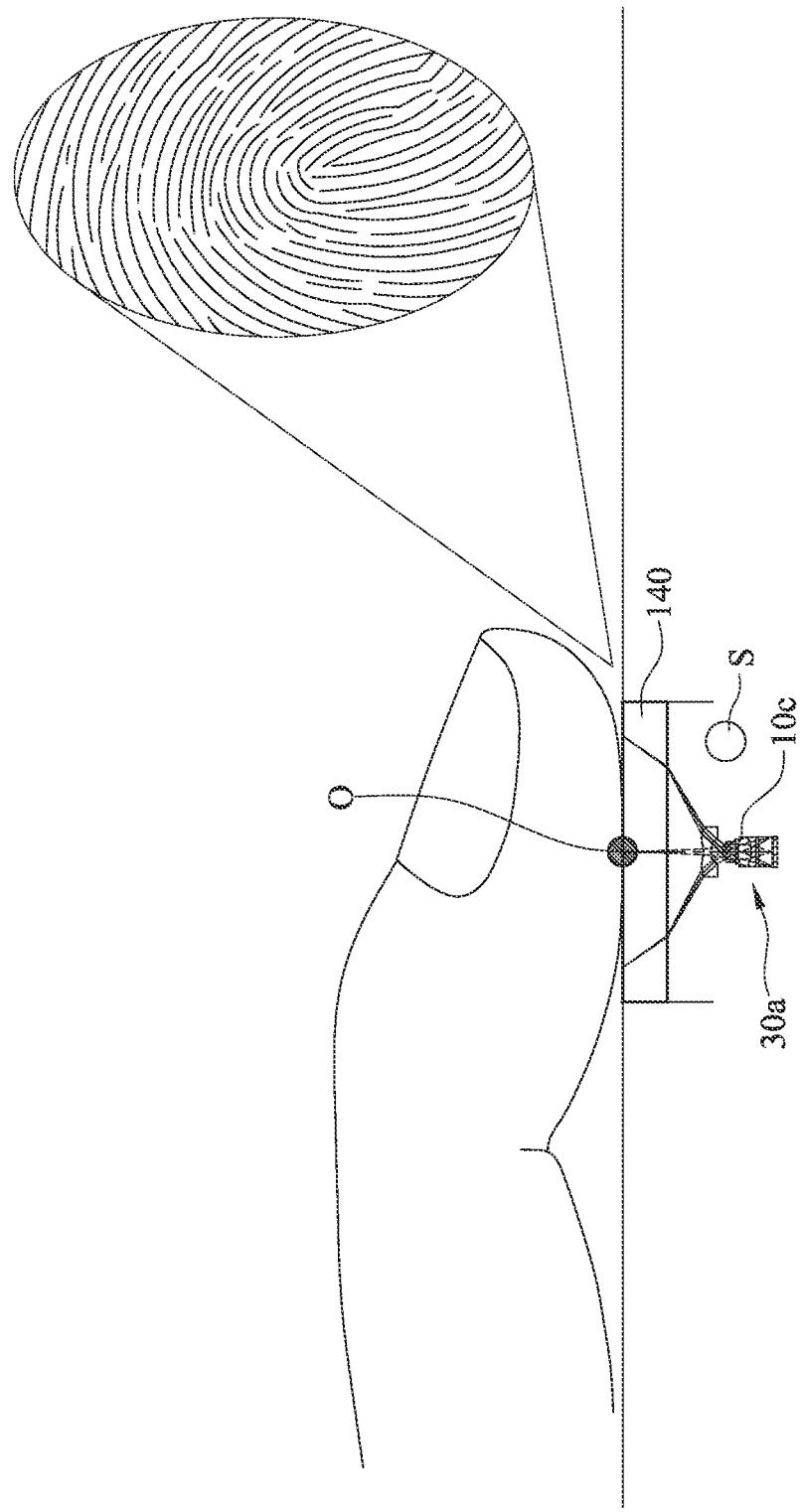
FIG. 28 is a schematic view of the electronic device in FIG. 27 identifying a fingerprint.

FIG. 27 is a perspective view of an electronic device according to the 10th embodiment of the present disclosure. FIG. 28 is a schematic view of the electronic device in FIG. 27 identifying a fingerprint.

In this embodiment, an electronic device 20a is a smartphone having a biometric identification function. The electronic device 20a includes a fingerprint identification module 30a and the light-permeable sheet 140 disclosed in the 1st embodiment. The fingerprint identification module 30a has a fingerprint identification function, which includes an image capturing unit 10c and a light source S. The image capturing unit 10c includes the optical imaging lens assembly of the present disclosure and an image sensor. The light source S is disposed on one side of the optical imaging lens assembly for illuminating the imaged object O, such that light rays from the imaged object O can travel through the light-permeable sheet 140 into the optical imaging lens assembly of the fingerprint identification module 30a. In this embodiment, the image capturing unit 10c is the image capturing unit disclosed in the 1st embodiment, but the present disclosure is not limited thereto.

According to the present disclosure, the optical imaging lens assembly of the image capturing units 10b and 10c features good capability in aberration corrections and high image quality, and the image capturing units 10b and 10c can be applied to smartphones for under-display fingerprint identification, but the present disclosure is not limited thereto. For example, the image capturing units 10b and 10c can be applied to electronic devices such as digital tablets, portable image-recording devices and multi-camera devices.

Furthermore, the image capturing units 10b and 10c can be applied to biometric identification and 3D (three-dimensional) image capturing applications, in products such as digital cameras, mobile devices, smart televisions, network surveillance devices, dashboard cameras, vehicle backup cameras, motion sensing input devices, wearable devices and other electronic imaging devices.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising three lens elements, the three lens elements being, in order from an object side to an image side, a first lens element, a second lens element and a third lens element, and each of the three lens elements having an object-side surface facing toward the object side and an image-side surface facing toward the image side;
wherein the object-side surface of the first lens element is concave in a paraxial region thereof, the object-side surface of the first lens element is aspheric and has at least one inflection point, the object-side surface of the first lens element has at least one critical point in an off-axis region thereof, and the optical imaging lens assembly has a total of three lens elements;
wherein a focal length of the optical imaging lens assembly is f, an entrance pupil diameter of the optical imaging lens assembly is EPD, a curvature radius of the object-side surface of the first lens element is R1, and the following conditions are satisfied:

$0.50 < f/EPD < 1.9$; and $-1.23 < R1/f < 0$.

2. The optical imaging lens assembly of claim 1, wherein the curvature radius of the object-side surface of the first lens element is R1, the focal length of the optical imaging lens assembly is f, and the following condition is satisfied:

$-1.08 < R1/f < 0$.

3. The optical imaging lens assembly of claim 1, wherein the curvature radius of the object-side surface of the first lens element is R1, the entrance pupil diameter of the optical imaging lens assembly is EPD, and the following condition is satisfied:

$-1.41 < R1/EPD < -0.5$.

4. The optical imaging lens assembly of claim 1, wherein the focal length of the optical imaging lens assembly is f, a focal length of the first lens element is f1, a focal length of the second lens element is f2, a focal length of the third lens element is f3, and the following conditions are satisfied:

$|f/f1| < 0.50$;

$|f/f2| < 0.30$; and $|f/f3| < 0.80$.

5. The optical imaging lens assembly of claim 1, wherein at least two lens elements of the optical imaging lens assembly are made of plastic material, and the image-side surface of the second lens element is concave in a paraxial region thereof.

6. The optical imaging lens assembly of claim 1, wherein the first lens element has negative refractive power, the third lens element has positive refractive power, and the image-side surface of the third lens element is convex in a paraxial region thereof.

7. An optical imaging lens assembly comprising three lens elements, the three lens elements being, in order from an object side to an image side, a first lens element, a second lens element and a third lens element, and each of the three lens elements having an object-side surface facing toward the object side and an image-side surface facing toward the image side;
wherein the object-side surface of the first lens element is concave in a paraxial region thereof, the object-side surface of the first lens element is aspheric and has at least one inflection point, the object-side surface of the first lens element has at least one critical point in an off-axis region thereof, the image-side surface of the second lens element is concave in a paraxial region thereof, and the optical imaging lens assembly has a total of three lens elements;
wherein a focal length of the optical imaging lens assembly is f, a focal length of the second lens element is f2, an entrance pupil diameter of the optical imaging lens assembly is EPD, and the following conditions are satisfied:

$0.50 < f/EPD < 1.9$; and $|f/f2| < 0.30$.

8. The optical imaging lens assembly of claim 7, wherein the focal length of the optical imaging lens assembly is f, the entrance pupil diameter of the optical imaging lens assembly is EPD, and the following condition is satisfied:

$1.0 < f/EPD < 1.7$.

9. The optical imaging lens assembly of claim 7, wherein an Abbe number of the first lens element is V1, an Abbe number of the second lens element is V2, an Abbe number of the third lens element is V3, and the following conditions are satisfied:

$45.0 < V1 < 60.0$;

$45.0 < V2 < 60.0$; and $45.0 < V3 < 60.0$.

10. The optical imaging lens assembly of claim 7, wherein a sum of central thicknesses of all lens elements of the optical imaging lens assembly is ΣCT, a sum of axial distances between each of all adjacent lens elements of the optical imaging lens assembly is ΣAT, and the following condition is satisfied:

$1.2 < \Sigma CT/\Sigma AT \leq 1.93$.

11. The optical imaging lens assembly of claim 7, wherein an axial distance between the object-side surface of the first lens element and an image surface is TL, the focal length of the optical imaging lens assembly is f, and the following conditions are satisfied:

$TL < 3.0$ [mm]; and $5.9 < TL/f < 8.5$.

12. The optical imaging lens assembly of claim 7, wherein the focal length of the optical imaging lens assembly is f, the entrance pupil diameter of the optical imaging lens assembly is EPD, half of a maximum field of view of the optical imaging lens assembly is HFOV, and the following condition is satisfied:

$1.0 < f/EPD + \cot(HFOV) \leq 2.05$.

13. An optical imaging lens assembly comprising three lens elements, the three lens elements being, in order from an object side to an image side, a first lens element, a second lens element and a third lens element, and each of the three lens elements having an object-side surface facing toward the object side and an image-side surface facing toward the image side;
wherein the object-side surface of the first lens element is concave in a paraxial region thereof, the object-side surface of the first lens element is aspheric and has at least one inflection point, the object-side surface of the first lens element has at least one critical point in an off-axis region thereof, and the optical imaging lens assembly has a total of three lens elements;
wherein a curvature radius of the object-side surface of the first lens element is R1, an entrance pupil diameter of the optical imaging lens assembly is EPD, an axial distance between the object-side surface of the first lens element and an image surface is TL, and the following conditions are satisfied:

$-4.0 < R1/EPD < 0$; and $8.80 \leq TL/EPD < 11.0$.

14. The optical imaging lens assembly of claim 13, wherein the curvature radius of the object-side surface of the first lens element is R1, a focal length of the optical imaging lens assembly is f, and the following condition is satisfied:

$-1.23 \leq R1/f < 0$.

15. The optical imaging lens assembly of claim 13, wherein a focal length of the optical imaging lens assembly is f, a focal length of the second lens element is f2, and the following condition is satisfied:

$|f/f2| < 0.30$.

16. The optical imaging lens assembly of claim 13, wherein a maximum value among Abbe numbers of all lens elements of the optical imaging lens assembly is Vmax, a minimum value among Abbe numbers of all lens elements of the optical imaging lens assembly is Vmin, and the following condition is satisfied:

$V\max - V\min < 15.0$.

17. The optical imaging lens assembly of claim 13, wherein an axial distance between the first lens element and the second lens element is T12, an axial distance between the second lens element and the third lens element is T23, and the following condition is satisfied:

$16.74 \leq T12/T23 < 40.0$.

18. The optical imaging lens assembly of claim 13, wherein a maximum effective radius of the object-side surface of the first lens element is Y11, a maximum effective radius of the image-side surface of the third lens element is Y32, a vertical distance between the critical point on the object-side surface of the first lens element and an optical axis is Yc11, and the following conditions are satisfied:

$1.25 < Y11/Y32 < 2.40$; and $0.30 < Yc11/Y11 < 0.90$.

19. The optical imaging lens assembly of claim 13, wherein each of at least two lens elements of the optical imaging lens assembly has at least one aspheric surface having at least one inflection point;
wherein a maximum field of view of the optical imaging lens assembly is FOV, and the following condition is satisfied:

$90.0[\deg.] \leq FOV < 140.0[\deg.]$.

20. The optical imaging lens assembly of claim 13, wherein the image-side surface of the second lens element is concave in a paraxial region thereof.

* * * * *